(12) United States Patent
Liu et al.

(10) Patent No.: US 11,828,972 B2
(45) Date of Patent: Nov. 28, 2023

(54) OPTICAL LAYERS, FILMS AND SYSTEMS

(71) Applicant: 3M INNOVATIVE PROPERTIES COMPANY, St. Paul, MN (US)

(72) Inventors: Tao Liu, Woodbury, MN (US); Gary T. Boyd, Woodbury, MN (US); David A. Rosen, North St. Paul, MN (US); Bharat R. Acharya, Woodbury, MN (US); Kevin W. Gotrik, Hudson, WI (US); David J. Rowe, Roseville, MN (US); Caleb T. Nelson, McKinney, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 40 days.

(21) Appl. No.: 17/639,025

(22) PCT Filed: Oct. 2, 2020

(86) PCT No.: PCT/IB2020/059277
§ 371 (c)(1),
(2) Date: Feb. 28, 2022

(87) PCT Pub. No.: WO2021/070027
PCT Pub. Date: Apr. 15, 2021

(65) Prior Publication Data
US 2022/0308281 A1    Sep. 29, 2022

Related U.S. Application Data

(60) Provisional application No. 62/913,922, filed on Oct. 11, 2019.

(51) Int. Cl.
*F21V 8/00* (2006.01)
*G02B 5/02* (2006.01)
(Continued)

(52) U.S. Cl.
CPC ......... *G02B 6/0053* (2013.01); *G02B 5/0231* (2013.01); *G02B 5/0278* (2013.01);
(Continued)

(58) Field of Classification Search
CPC .. G02B 6/0053; G02B 5/0231; G02B 5/0278; G02B 6/0031; G02B 6/0051; G02B 6/0055
See application file for complete search history.

(56) References Cited

U.S. PATENT DOCUMENTS 3,351,753 A    11/1967   Berger
3,721,818 A     3/1973   Stahlhut
(Continued)

FOREIGN PATENT DOCUMENTS

WO    WO 2007-066729    6/2007
WO    WO 2009-110294    9/2009
(Continued)

OTHER PUBLICATIONS

International Search Report for PCT International Application No. PCT/IB2020/059277, dated Dec. 28, 2020, 3 pages.

*Primary Examiner* — Joseph L Williams
(74) *Attorney, Agent, or Firm* — Clifton F. Richardson

(57) ABSTRACT

An optical system includes an extended illumination source configured to emit light from an extended emission surface thereof and a light redirecting layer disposed on the extended emission surface. The light redirecting layer has a structured major surface that includes a regular array of light redirecting structures, each light redirecting structure including a plurality of facets; and a plurality of discrete spaced apart window segments. The optical system includes a plurality of reflective segments where each reflective segment is disposed on a corresponding window segment. For substantially normally incident light, each reflective segment has a total: average optical reflectance of at least 30% in a visible wavelength range extending from about 420 nm to about 650 nm; and optical transmittance of at least 10% for at least one infrared wavelength in an infrared wavelength range extending from about 800 nm to about 1200 nm.

15 Claims, 22 Drawing Sheets

(51) Int. Cl.
*G02F 1/1333* (2006.01)
*G02F 1/1335* (2006.01)

(52) U.S. Cl.
CPC ......... *G02B 6/0031* (2013.01); *G02B 6/0051* (2013.01); *G02B 6/0055* (2013.01); *G02F 1/13338* (2013.01); *G02F 1/133528* (2013.01)

(56) References Cited

U.S. PATENT DOCUMENTS

| | | |
|---|---|---|
| 3,866,036 A | 2/1975 | Taltavull |
| 5,175,030 A | 12/1992 | Lu |
| 5,183,597 A | 2/1993 | Lu |
| 5,839,823 A | 11/1998 | Hou |
| 5,882,774 A | 3/1999 | Jonza |
| 6,179,948 B1 | 1/2001 | Merrill |
| 6,783,349 B2 | 8/2004 | Neavin |
| 8,016,475 B2 | 9/2011 | Travis |
| 8,690,373 B2 | 4/2014 | Epstein |
| 8,882,323 B2 | 11/2014 | Solomon |
| 9,162,406 B2 | 10/2015 | Neavin |
| 2006/0114569 A1 | 6/2006 | Capaldo |
| 2006/0250707 A1 | 11/2006 | Whitney |
| 2011/0110104 A1 | 5/2011 | Kim |
| 2015/0062485 A1 | 3/2015 | Lee |
| 2015/0369433 A1 | 12/2015 | Chen |
| 2018/0156957 A1 | 6/2018 | Larsen |

FOREIGN PATENT DOCUMENTS

| | | |
|---|---|---|
| WO | WO 2018-178802 | 10/2018 |
| WO | WO 2018-178803 | 10/2018 |
| WO | WO 2020-225731 | 11/2020 |

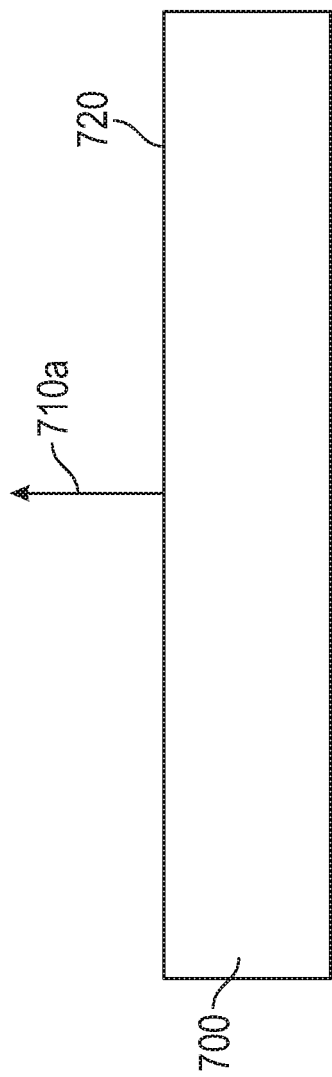

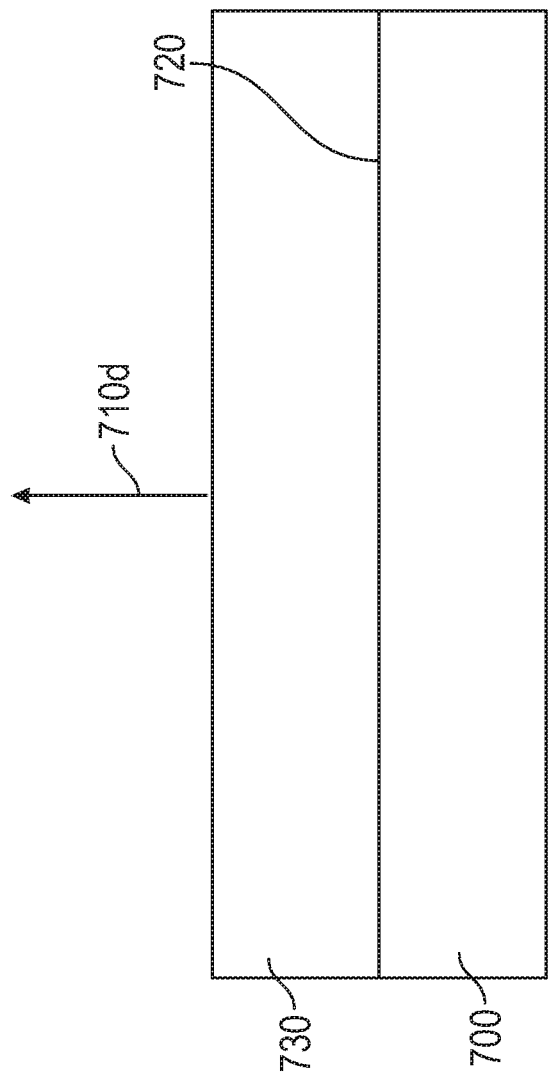

OPTICAL LAYERS, FILMS AND SYSTEMS

CROSS REFERENCE TO RELATED APPLICATIONS

This application is a national stage filing under 35 U.S.C. 371 of PCT/IB2020/059277, filed Oct. 2, 2020, which claims the benefit of Provisional Application No. 62/913,922, filed Oct. 11, 2019, the disclosures of which are incorporated by reference in their entirety herein.

BACKGROUND

A liquid crystal display can utilize prism films for enhancing the brightness of the display.

SUMMARY

In some aspects, the present disclosure provides optical layers, such as light redirecting layers and/or structured optical layers, and optical films, such as light redirecting films. In some aspects, the present disclosure provides optical systems including the optical layers or films. For example, one or more of the optical layers or films maybe used in an optical system, such as a liquid crystal display system, to enhance the brightness of the optical system while allowing an image reflected from a fingerprint to pass through the optical layers or films to a detector.

In some aspects, the present disclosure provides an optical system including an extended illumination source configured to emit light from an extended emission surface thereof. The extended illumination source can include at least one light source; and a reflecting layer spaced apart from, and substantially co-extensive with, the extended emission surface, where the reflecting layer is configured to reflect incident light that is emitted from the at least one light source toward the extended emission surface. The optical system further includes a first light redirecting layer defining a plane of the first light redirecting layer and disposed on the extended emission surface. The first light redirecting layer can include a first structured major surface opposite a second major surface, where the first structured major surface includes a regular array of first light redirecting structures and a plurality of discrete spaced apart first window segments substantially parallel to the plane of the first light redirecting layer. Each first light redirecting structure can include a plurality of first facets making oblique angles with the plane of the first light redirecting layer. The optical system includes a plurality of first reflective segments. Each first reflective segment can be disposed on, and substantially co-extensive with, a corresponding first window segment, such that for substantially normally incident light, each first reflective segment has a total: average optical reflectance of at least 30% in a visible wavelength range extending from about 420 nm to about 650 nm; and optical transmittance of at least 10% for at least one infrared wavelength in an infrared wavelength range extending from about 800 nm to about 1200 nm.

In some aspects, the present disclosure provides a structured optical layer that defines a plane of the structured optical layer and includes a structured surface including a regular array of first segments where each first segment makes an angle from about 30 degrees to about 60 degrees with the plane of the structured optical layer, and a plurality of second segments where each second segment makes an angle of less than about 10 degrees with the plane of the structured optical layer. The structured optical layer includes a multilayer film disposed on each of at least a majority of the second segments. Each layer in the multilayer film can have a thickness less than about 500 nm, such that for substantially normally incident light, the multilayer film has a total: average optical reflectance of at least 50% in a visible wavelength range extending from about 420 nm to about 650 nm; and optical transmittance of at least 30% for at least one infrared wavelength in an infrared wavelength range extending from about 800 nm to about 1200 nm. An optical system can include an extend light source having an emission surface and one or more of the structured optical layers disposed on the emission surface.

In some aspects, the present disclosure provides an optical system including an extended illumination source configured to emit visible light in a wavelength range extending from about 420 nm to about 650 nm from an extended emission surface thereof. The extended illumination source can include at least one light source configured to emit visible light; and a reflecting layer spaced apart from, and substantially co-extensive with, the extended emission surface. The optical system can further include a liquid crystal display panel disposed on, and substantially co-extensive with, the extended emission surface, and configured to form a visible image for viewing by a viewer. The optical system further includes a reflective polarizer disposed between the extended illumination source and the liquid crystal display panel, and at least one light redirecting layer disposed between the reflective polarizer and the extended illumination source. The at least one light redirecting layer can include a regular array of linear prismatic structures extending along a first direction and arranged along an orthogonal second direction. The at least one light redirecting layer increases a brightness of light exiting the optical system along a normal direction substantially perpendicular to the optical system by recycling a portion of light emitted by the extended emission surface. When an infrared image having an infrared wavelength in a range from about 800 nm to about 1200 nm is incident on the optical system along the normal direction, the optical system transmits at least a portion of the incident infrared image therethrough along the normal direction, such that when the infrared image has a first spatial frequency of at least about 8 line pairs per mm, the transmitted infrared image has a modulation transfer function (MTF) of greater than about 0.5 at the first spatial frequency.

In some aspects, the present disclosure provides a light redirecting film including a light redirecting layer including a first structured major surface opposite a second major surface. The first structured major surface can include a plurality of substantially parallel linear truncated prismatic structures extending along a first direction and arranged along an orthogonal second direction. Each truncated prismatic structure can include opposing side facets making an angle in a range from about 60 degrees to about 120 degrees with each other, and atop facet substantially parallel to the second major surface and connecting the opposing side facets. The light redirecting film can further include a plurality of multilayer segments, where each multilayer segment is disposed on, and substantially co-extensive with, the top facet of a corresponding truncated prismatic structure. Each multilayer segment can include a plurality of stacked layers. Each layer can have a thickness less than about 500 nm, such that for substantially normally incident light, the multilayer segment has a total average optical reflectance of at least 50% in a visible wavelength range extending from about 420 nm to about 650 nm, and a total optical transmittance of at least 30% for at least one infrared wavelength in an infrared wavelength range extending from about 800 nm to about 1200 nm, such that when the light redirecting film is disposed on a Lambertian light source that emits visible light in the visible wavelength range, and has a total average optical reflectance of at least 85% in the visible wavelength range and a first luminance along a direction normal to the Lambertian light source, light transmitted by the light redirecting film has a second luminance along the normal direction. A ratio of the second luminance to the first luminance is greater than about 1. An optical system can include an extend light source having an emission surface and one or more of the light redirecting films disposed on the emission surface.

BRIEF DESCRIPTION OF THE DRAWINGS

FIG. 13A is a schematic cross-sectional view of a light source;

FIG. 13B is a schematic cross-sectional view of a light redirecting film disposed on a light source;

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

A liquid crystal display (LCD) can utilize prism films for enhancing the brightness of the display by recycling light. Conventional prism films for brightness enhancement have typically utilized prisms having an approximately 90 degree included angle with minimal tip radius for maximizing axial brightness. It is often desired to sense fingerprint through the LCD backlight and the LCD panel. The use of conventional prism films makes this difficult due to fingerprint image splitting when imaged light is transmitted through the prism films. Truncated prisms may be used to allow light reflected from a fingerprint to pass through the truncated portions of the prims. However, the axial brightness of the display can be significantly reduced in this case due to the prism truncation. According to some embodiments, it has been found that truncated prism films with visible light reflective, infrared transmissive segments on the truncated prisms provide a desired axial brightness increase while allowing infrared light reflected from a fingerprint to be transmitted through the truncated prism film substantially normally to a plane of the truncated prism film to reach an infrared sensor disposed behind a backlight, for example. Structures other than truncated prisms can be used as described further elsewhere herein.

Figure 1:
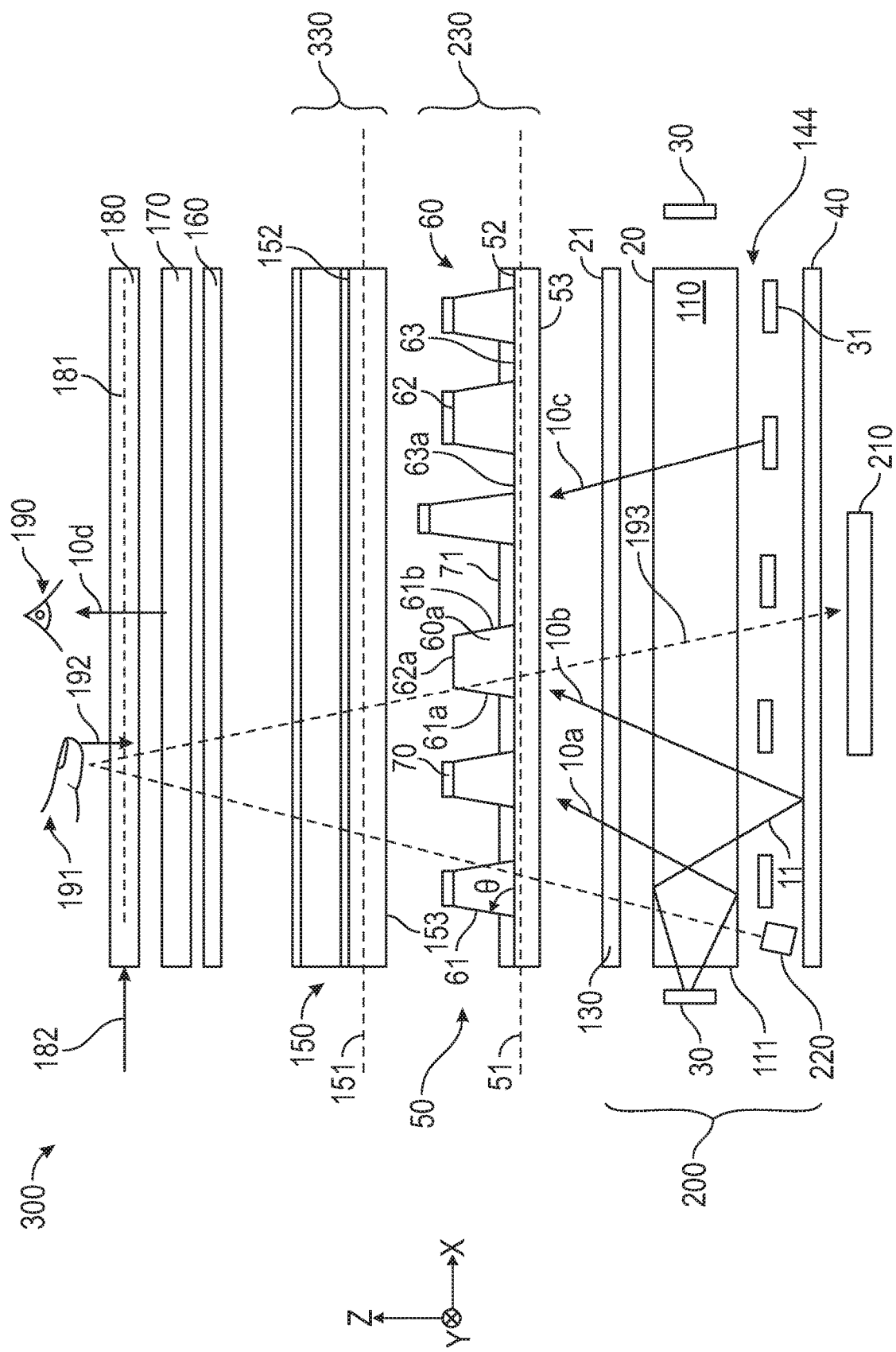
FIG. 1 is a schematic exploded cross-sectional view of an optical system.
Figure 2A:
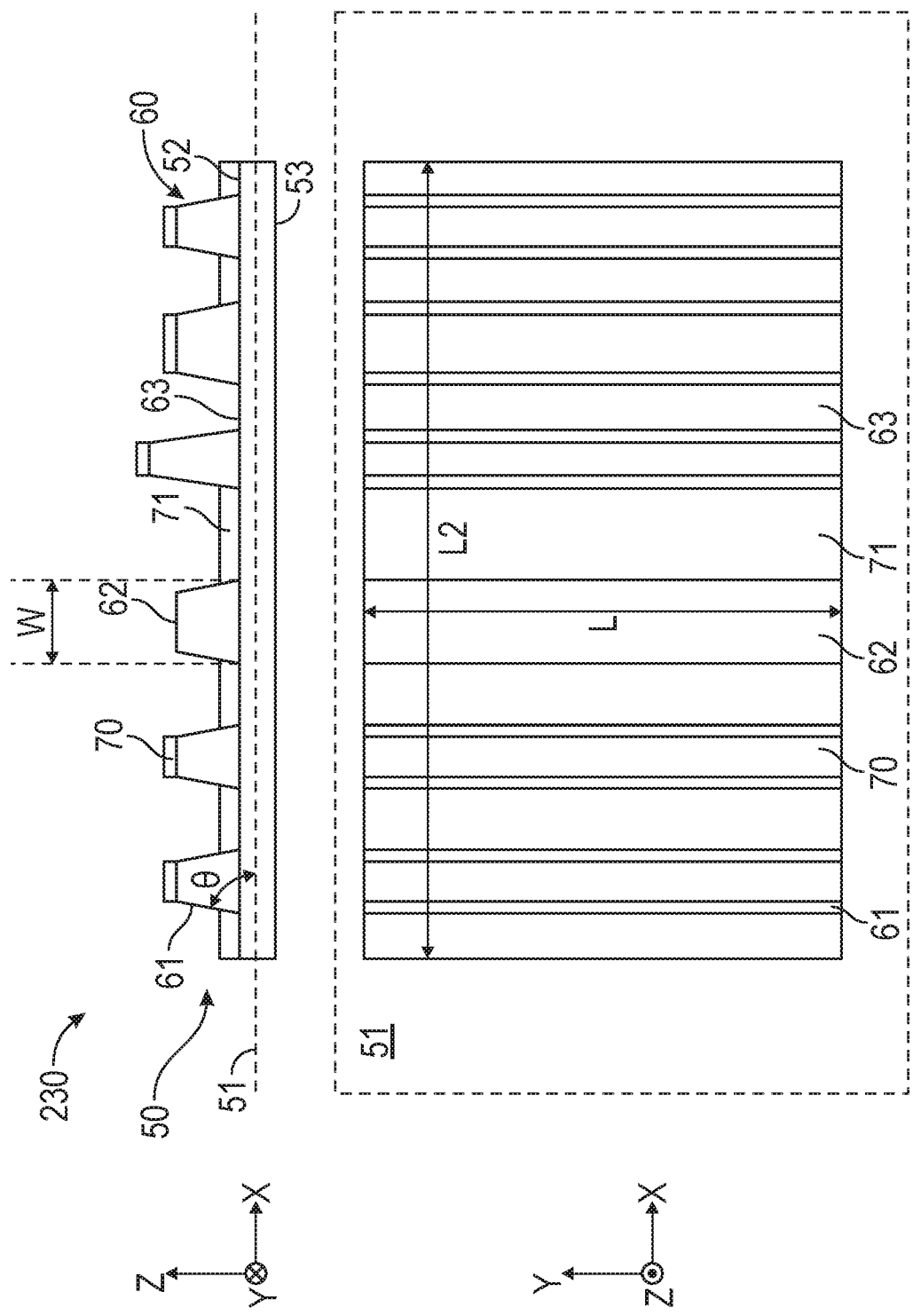
FIGS. 2A-2B are schematic illustrations of cross-sectional views and top projected views of light redirecting films.
Figure 2B:
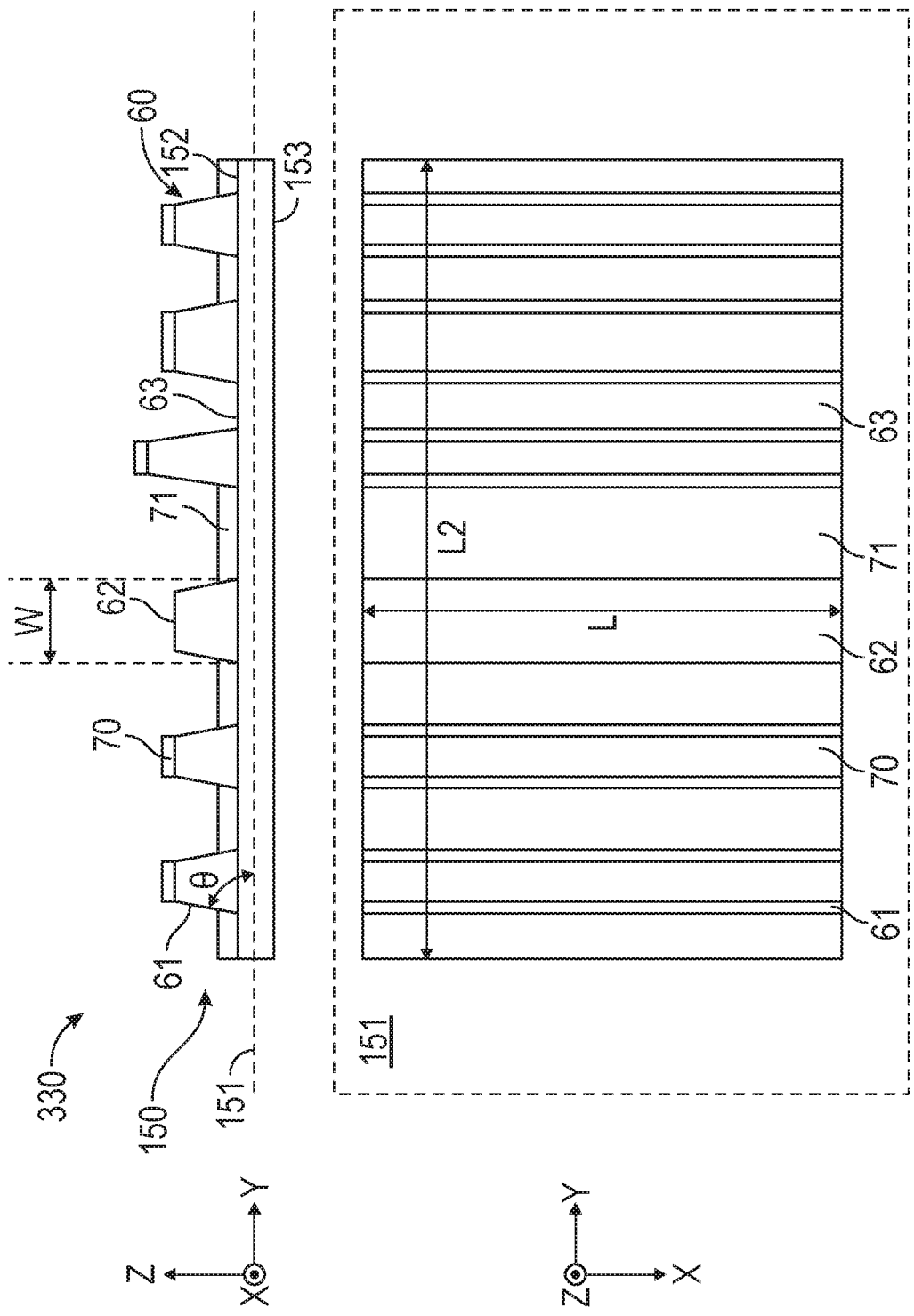

FIG. 1 is a schematic exploded cross-sectional view of an optical system 300. In some embodiments, the optical system 300 includes an extended illumination source 200 and a light redirecting film 230 which includes a first light redirecting layer 50. FIG. 2A is a schematic illustration of a cross-sectional view and a view of the light redirecting film 230 projected onto the plane 51 of the light redirecting layer 50. FIG. 2B is a schematic illustration of a cross-sectional view and a view of a second light redirecting film 330 projected onto the plane 151 of the light redirecting layer 150. Second light redirecting film 330 may correspond to light redirecting film 230 except for orientation of the light redirecting structures.

The extended illumination source 200 is configured to emit light (10a-10c) from an extended emission surface (e.g., 20, or 21 if the first optically diffuse layer 130 is included in the extended illumination source 200) thereof. The extended illumination source 200 includes at least one light source 30, 31, and a reflecting layer 40 spaced apart from the extended emission surface. The reflecting layer can be substantially co-extensive with the extended emission surface (e.g., a layer or surface can be substantially coextensive with another layer or surface when at least 60% or at least 80% or at least 90% of a total area of the layer or surface is coextensive with at least 60% or at least 80% or at least 90%, respectively, of a total area of the other layer or surface). The reflecting layer 40 is configured to reflect incident light 11 that is emitted from the at least one light source toward the extended emission surface. The reflecting layer 40 can be a diffusely reflecting layer, or a specularly reflecting layer. The reflecting layer 40 can be reflective for visible light and at least partially transmissive for infrared light (e.g., to allow infrared light reflected from a fingerprint to pass through the reflecting layer 40). The at least one light source can include light source(s) 30 disposed proximate one or both ends of a lightguide 110 and/or can include light source(s) 31 disposed between the reflecting layer 40 and a first optically diffusing layer 130. In some embodiments, one or the other set of light source(s) 30 and 31 is omitted.

The first light redirecting layer 50 defines a plane 51 of the first light redirecting layer 50 and is disposed on the extended emission surface. The light redirecting layer 50 can be disposed directly or indirectly (e.g., in direct contact or through an adhesive layer) on the emission surface. For example, the light redirecting film 230 which includes the first light redirecting layer 50 may correspond to the light redirecting film 730 which is disposed on emission surface 720 as schematically illustrated in FIG. 13B. The first light redirecting layer 50 includes a first structured major surface 52 opposite a second major surface 53. The first structured major surface 52 includes a regular array (e.g., a periodic array or a predetermined regular pattern) of first light redirecting structures 60 and a plurality of discrete spaced apart first window segments 62, 63 substantially parallel (e.g., parallel to within 30 degrees, or 20 degrees, or 10 degrees, or 5 degrees) to the plane 51 of the first light redirecting layer 50. Each first light redirecting structure can include a plurality of first facets 61 making oblique angles θ with the plane 51 of the first light redirecting layer 50. In some embodiments, the first structured major surface 52 can include structures in addition to the regular array of first light redirecting structures 60. The first structured major surface 52 can face away from the extended light source 200.

The optical system 300 further includes a plurality of first reflective segments 70 and/or 71. For example, optical system 300 can include the light redirecting film 230 which includes the first light redirecting layer 50 and which can further include the plurality of first reflective segments 70, 71. In some embodiments, each first reflective segment 70, 71 is disposed on, and is substantially co-extensive with, a corresponding first window segment, such that for substantially normally incident (e.g., within 30 degrees, or 20 degrees, or 10 degrees, or 5 degrees of normally incident) light 120 (see, e.g., FIGS. 3B-3C), each first reflective segment has a total average optical reflectance of at least 30% in a visible wavelength range 80 (see FIG. 4) extending from about 420 nm to about 650 nm; and a total optical transmittance of at least 10% for at least one infrared wavelength 91 (see FIG. 4) in an infrared wavelength range 90 (see FIG. 4) extending from about 800 nm to about 1200 nm.

In some embodiments, the extended illumination source 200 includes a lightguide 110 for propagating light (e.g., 10a, 11) therein along a length (x-axis) and width (y-axis) of the lightguide. The lightguide is disposed between the reflecting layer 40 and the first light redirecting layer 50 and can include the extended emission surface 20. In some embodiments, the at least one light source 30 is disposed proximate an edge surface 111 of the lightguide. In some such embodiments, the light source(s) 31 illustrated in FIG. 1 are omitted. In some embodiments, the reflecting layer is configured to reflect light 11 that exits the lightguide toward the reflecting layer. The reflected light 10b propagates toward the first light redirecting layer 50. The lightguide 110 can be any suitable type of lightguide and can include light extractors for extracting light propagating in the lightguide 110. Suitable lightguides are known in the art (see, e.g., U.S. Pat. Appl. Pub. No. 2018/0156957 (Larsen et al.) and U.S. Pat. No. 8,882,323 (Solomon et al.)).

In some embodiments, the extended illumination source 200 includes a first optically diffusive layer 130 for scattering light. The first optically diffusive layer 130 can include the extended emission surface 21. The first optically diffusive layer 130 and the reflecting layer 40 are substantially coextensive with each other and defines an optical cavity 144 therebetween. In some embodiments, the at least one light source 31 is disposed in the optical cavity. In some such embodiments, the light source(s) 30 illustrated in FIG. 1 are omitted.

In some embodiments, each first light redirecting structure in the regular array of light redirecting structures 60 is a linear structure (see, e.g., FIG. 2A). In some embodiments, the first facets 61 of the first light redirecting structure extend along a length direction (y-axis) of the first light redirecting structure. In some embodiments, the first light redirecting structure has a length L and a width W, where L/W>10, or L/W>30, or L/W>100.

In some embodiments, at least one first window segment 63 in the plurality of first window segments is a land segment between two adjacent first light redirecting structures in the regular array of first light redirecting structures 60.

In some embodiments, at least one first window segment 62a in the plurality of first window segments 62, 63 is a top segment of a truncated first light redirecting structure 60a in the regular array of first light redirecting structures. In some embodiment, the at least one first widow segment 62a connects the plurality of first facets 61a, 61b of the truncated first light redirecting structure 60a to each other. In some embodiments, at least one first window segment 62a, 63a in the plurality of first window segments 63, 63 does not have a first reflective segment from the plurality of first reflective segments 70, 71 disposed thereon.

In some embodiments, the oblique angle θ that each first facet 61 of each first light redirecting structure 60 makes with the plane 51 of the first light redirecting layer 50 is from about 30 degrees to about 60 degrees, or from about 40 degrees to about 50 degrees.

In some embodiments, when projected onto the plane of the first light redirecting layer, a ratio of a projected area of the plurality of discrete spaced apart first window segments to a projected area of the first structured major surface is from about 0.1 to about 0.5. For example, the projected area of the first window segments 62, 63 is the area of the reflective segments 70, 71 plus the area of the window segments 63 not including a reflective segment (see, e.g., FIG. 2A). The projected area of the first structure major surface 52 is L times L2. In some embodiments, the ratio is from about 0.15 to about 0.4. In some embodiments, the ratio is from about 0.2 to about 0.3. In some embodiments, the ratio is about 0.25. It has been found that a ratio in these ranges can provide sufficient recycling for brightness enhancement due to the first facets 61 (e.g., via the same mechanism as brightness enhancement prism films) and due to the reflective segments 70, 71 while providing sufficient transmission of infrared light in a direction substantially normal to the plane 51 for fingerprint detection.

In some embodiments, the optical system 300 further includes a second light redirecting layer 150. The second light redirecting layer 150 defines a plane 151 of the second light redirecting layer 150 and is disposed on the first light redirecting layer 50. The second light redirecting layer includes a third structured major surface 152 opposite a fourth major surface 153. The third structured major surface 252 can face away from the first light redirecting layer 50. In the illustrated embodiment, the second light redirecting layer 150 may be as described for the first light redirecting layer 50 except that the second light redirecting layer 150 may be rotated about the z-axis (e.g., by about 90 degrees) relative to the first light redirecting layer 50. In other embodiments, the second light redirecting layer 150 may have different shapes (e.g., different angles θ) and/or arrangement (e.g., pitch) of light redirecting structures. In some embodiments, the third structured surface 152 includes a regular array of second light redirecting structures 60, where each second light redirecting structure includes a plurality of second facets 61 making oblique angles θ with the plane 151 of the second light redirecting layer 150. In some embodiments, the third structured surface 152 includes a plurality of discrete spaced apart first second window segments 62, 63 substantially parallel to the plane 151 of the second light redirecting layer 150. In some embodiments, the optical system 300, and/or the second light redirecting film 330 which includes the second light redirecting layer 150, includes a plurality of second reflective segments 70, 71, where each second reflective segment is disposed on, and is substantially co-extensive with, a corresponding second window segment 62, 63. In some embodiments, for substantially normally incident light 120, each second reflective segment 70, 71 has a total average optical reflectance of at least 30% in the visible wavelength range; and has a total optical transmittance of at least 10% for the at least one infrared wavelength in the infrared wavelength range. The reflective segments of the second light redirecting film 330 can have any of the reflectance and transmittance properties of the reflective segments of the first light redirecting film 230 described elsewhere herein.

In some embodiments, the optical system 300 further includes a second optically diffusive layer 160 disposed on the first light redirecting layer 50 (e.g., indirectly disposed on the first light redirecting layer 50 through the second light redirecting layer 150). In some embodiments, the second optically diffusive layer 160 and the reflecting layer 40 are substantially coextensive with each other. In some embodiments, the second optically diffusive layer 160 has a greater average specular transmission in the infrared wavelength range 90 than in the visible wavelength range 80 (see FIG. 4).

In some embodiments, the optical system 300 further includes a reflective polarizer 170 disposed on the first light redirecting layer 50. In some embodiments, the optical system 300 further includes a liquid crystal display panel 180 disposed on the first light redirecting layer 50 for forming an image 181 in response to an image signal 182, where the image is viewable by a viewer 190.

Figure 4:
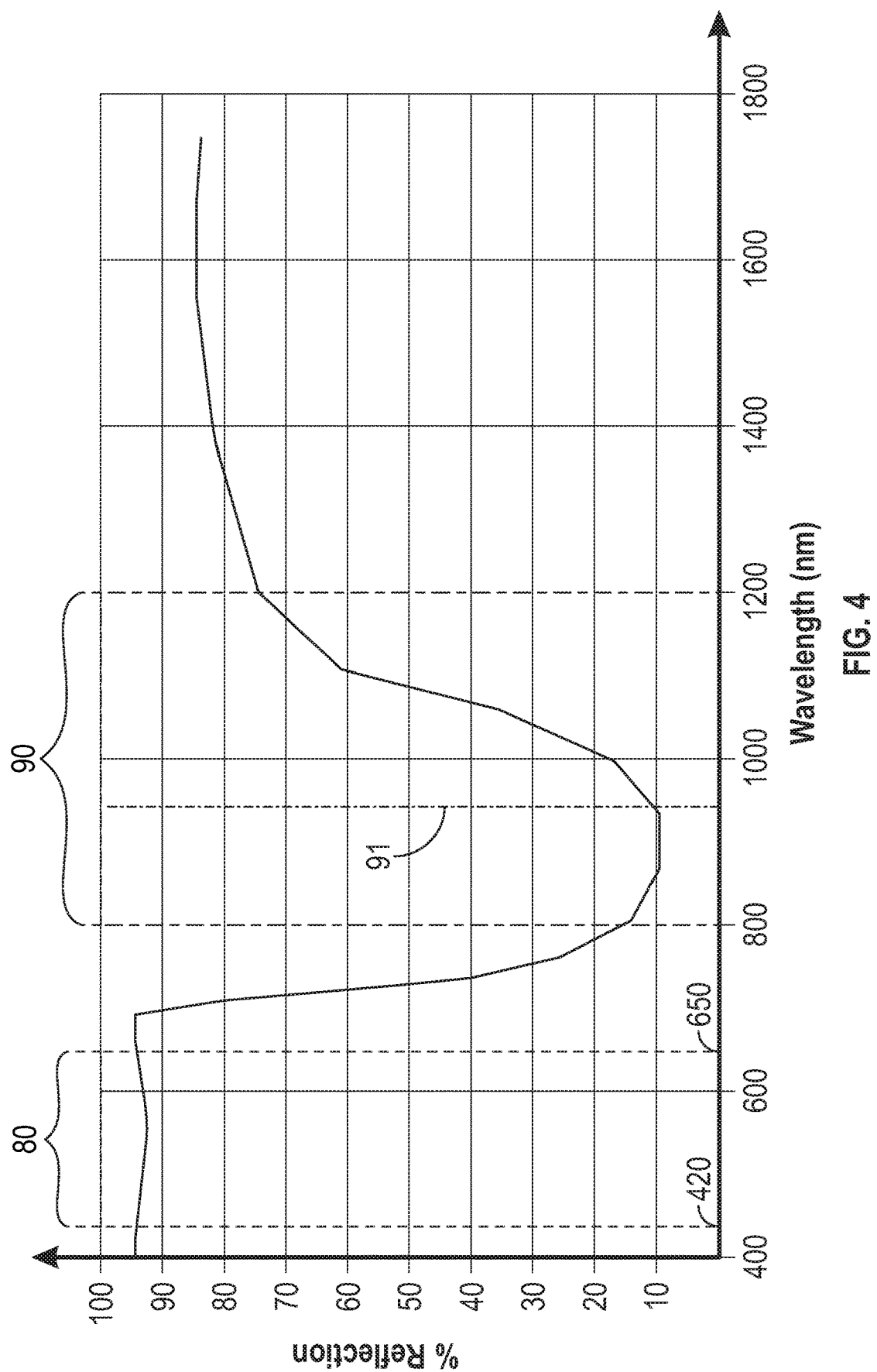
FIG. 4 is a schematic plot of total optical reflectance versus wavelength.

In some embodiments, the optical system 300 further includes an infrared detector 210 configured to sense the at least one infrared wavelength 91 in the infrared wavelength range 90 (see, e.g., FIG. 4). In some embodiments, the extended illumination source 200 is disposed between the first light redirecting layer 50 and the infrared detector 210.

In some embodiments, the optical system 300 further includes an infrared light source 220 for illuminating an object 191 disposed proximate the optical system 300 with the at least one infrared wavelength 91. In some embodiments, when the object 191 has a first spatial frequency of at least about 8 line pairs per mm, or at least about 10 line pairs per mm, or at least about 12 line pairs per mm, the detector 210 senses, and forms an image 193, of the illuminated object 191 through the extended illumination source 200 and the first light redirecting layer 50, the image has a modulation transfer function (MTF) of greater than about 0.5 at the first spatial frequency (see, e.g., FIG. 12). In some embodiments, the MTF is greater than about 0.6 or greater than about 0.7 at the first spatial frequency. In some embodiments, the optical system 300 further includes an angle selective filter disposed between the reflecting layer 40 and the detector 210 for filtering light redirected by the light redirecting layers 50 and 150 while transmitting light transmitted through the light redirecting layers 50 and 150 substantially normally through the planes 51 and 151.

Figure 3C:
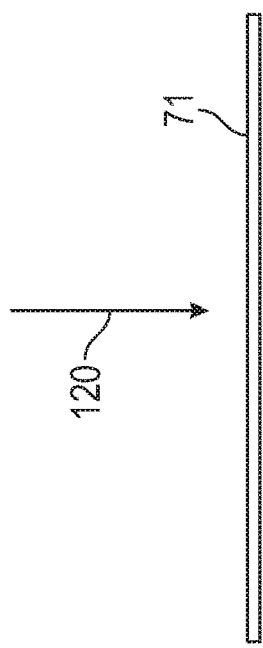
FIGS. 3A-3C schematically illustrate substantially normally incident light on various layers or segments.
Figure 3B:
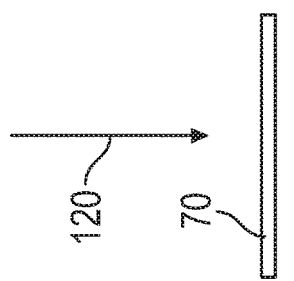
Figure 3A:
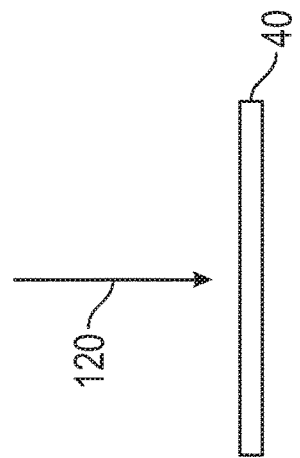

FIGS. 3A-3C schematically illustrate substantially normally incident light 120 on various layers or segments. In FIG. 3A, light 120 is substantially normally incident on the reflecting layer 40. In FIG. 3B, light 120 is substantially normally incident on a reflective segment 70. In FIG. 3C, light 120 is substantially normally incident on a reflective segment 71. In each case, a portion of the incident light 120 can be reflected and another portion can be transmitted. In some cases, a portion (e.g., less than about 5%, or less than about 2%, or less than about 1%) can be absorbed.

FIG. 4 is a schematic plot of total optical reflectance versus wavelength for a layer or segment (e.g., corresponding to any one of reflecting layer 40 or reflective segment 70 or 71). A visible wavelength range 80 extending from about 420 nm to about 650 nm, and an infrared wavelength range 90 extending from about 800 nm to about 1200 nm are illustrated. An infrared wavelength 91 in the infrared wavelength range 90 is indicated.

In some embodiments, for substantially normally incident light 120, each first reflective segment 70, 71 has a total average optical reflectance of at least 50% in the visible wavelength range 80, and a total optical transmittance of at least 30% for the at least one infrared wavelength 91 in the infrared wavelength range 90. The average is an unweighted mean over wavelengths. The average can be for unpolarized light or for light having a specified polarization. In some embodiments, for substantially normally incident light 120, each first reflective segment 70, 71 has a total average optical reflectance of at least 70% in the visible wavelength range 80, and a total optical transmittance of at least 40% for the at least one infrared wavelength 91 in the infrared wavelength range 90. In some embodiments, for substantially normally incident light 120, each first reflective segment 70, 71 has a total average optical reflectance of at least 90% in the visible wavelength range 80; and a total optical transmittance of at least 50%, or at least 60%, or at least 70% for the at least one infrared wavelength 91 in the infrared wavelength range 90. In some embodiments, for substantially normally incident light 120 and for each of mutually orthogonal first (e.g., x-axis) and second (e.g., y-axis) polarization states, the reflecting layer 40 has a total average optical reflectance of at least 80% in the visible wavelength range 80; and a total optical transmittance of at least 20%, or at least 40%, or at least 50%, or at least 60%, or at least 70% for the at least one infrared wavelength 91 in the infrared wavelength range 90.

Figure 5B:
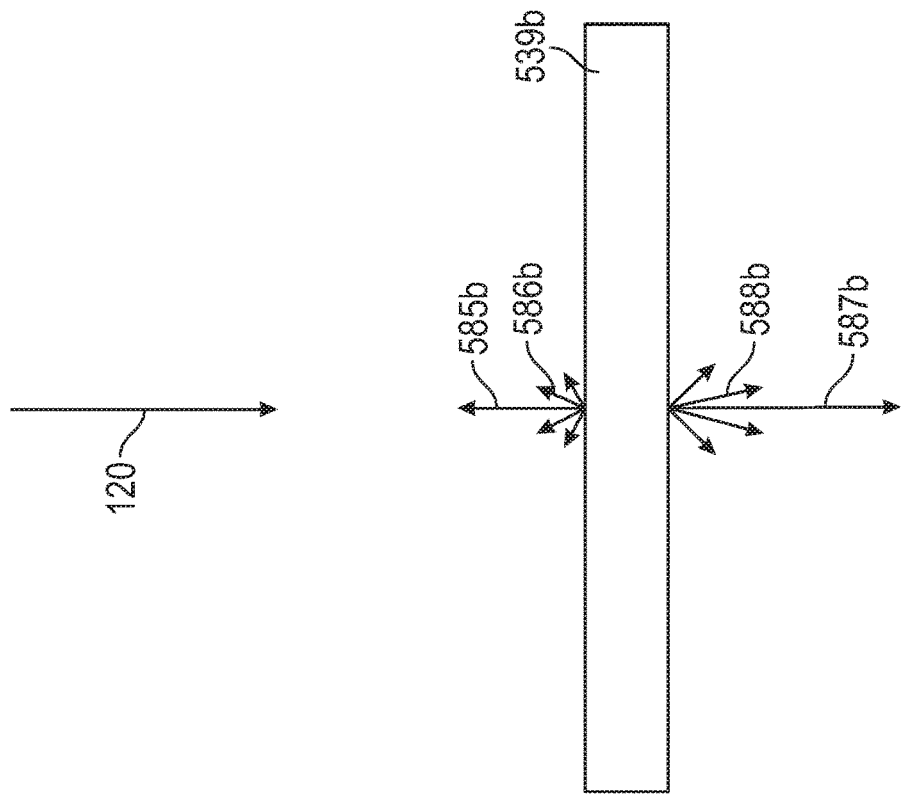
FIGS. 5A-5B schematically illustrate total optical reflectance and total optical transmittance for different layers, films, or segments.
Figure 5A:
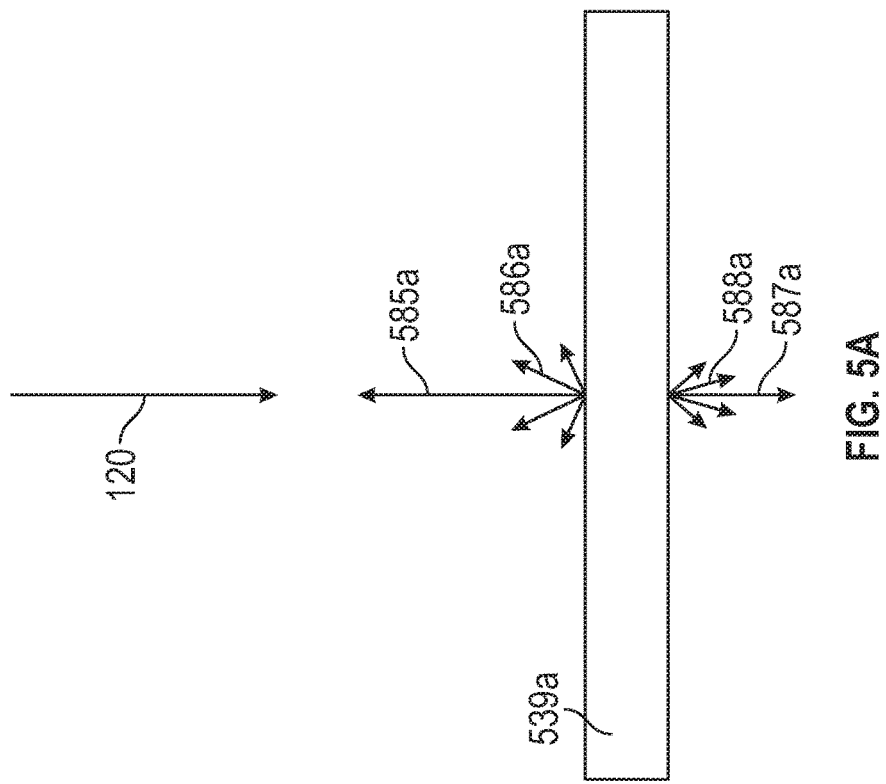

The reflected and transmitted portions of the incident light 120 can each include a specular portion and a diffuse portion. FIGS. 5A-5B schematically illustrate total optical reflectance (total of diffuse and specular reflectance) and total optical transmittance (total of diffuse and specular transmittance) for different layers, films, or segments and/or for different wavelengths. In FIG. 5A, light 120 is substantially normally incident on layer, film, or segment 539a (e.g., corresponding to any one or more of layer or segments 40, 70, 71; or optically diffusive layer 130 or 160; or reflective polarizer 170). A reflected portion 585a, 586a of the light 120 includes a specularly reflected portion 585a and a diffusely reflected portion 586a, and a transmitted portion 587a, 588a of the light 120 includes a specularly transmitted portion 587a and a diffusely transmitted portion 588a. In FIG. 5B, light 120 is substantially normally incident on layer, film, or segment 539b (e.g., corresponding to any one or more of layer or segments 40, 70, 71; or optically diffusive layer 130 or 160; or reflective polarizer 170). A reflected portion 585b, 586b of the light 120 includes a specularly reflected portion 585b and a diffusely reflected portion 586b, and a transmitted portion 587b, 588b of the light 120 includes a specularly transmitted portion 587b and a diffusely transmitted portion 588b. The layers, films, or segments 539a and 539b can be different layers, films, or segments and the incident light 120 can have a same wavelength or wavelength range in FIGS. 5A-5B; or the layers, films, or segments 539a and 539b can be a same layer, film, or segment and the incident light 120 can have different wavelengths or wavelength ranges in FIGS. 5A-5B, for example.

In some embodiments, the reflectance and transmittance for each first reflective segment 70, 71 is substantially specular. In some embodiments, for each first reflective segment 70, 71 and for substantially normally incident light 120, at least 70%, or at least 80%, of: the total average optical reflectance of the first reflective segment in the visible wavelength range 80 is specular optical reflectance; and the total optical transmittance of the first reflective segment for the at least one infrared wavelength 91 in the infrared wavelength range 90 is specular optical transmittance.

In some embodiments, the optically diffusive layer (e.g., first optically diffusive layer 130 and/or second optically diffusive layer 160) has a greater average specular transmission in the infrared wavelength range (e.g., corresponding to specularly transmitted portion 587b) than in the visible wavelength range (e.g., corresponding to specularly transmitted portion 587a).

In some embodiments, the optical system 300 further includes a reflective polarizer 170 disposed on the first light redirecting layer 50, such that for substantially normally incident light 120, the reflective polarizer 170 has a total average optical reflectance of at least 50% in the visible wavelength range 80 for a first polarization state (e.g., x-axis); a total average optical transmittance of at least 50% in the visible wavelength range for a second polarization state (e.g., y-axis) perpendicular to the first polarization state; and a total optical transmittance of at least 20% for the at least one infrared wavelength 91 in the infrared wavelength range 90 for at least one of the first and second polarization states. In some embodiments, the reflective polarizer 170 has a total average optical reflectance of at least 60% in the visible wavelength range 80 for a first polarization state; a total average optical transmittance of at least 60% in the visible wavelength range 80 for a second polarization state perpendicular to the first polarization state; and a total optical transmittance of at least 40% for the at least one infrared wavelength 91 in the infrared wavelength range 90 for at least one of the first and second polarization states. In some embodiments, the reflective polarizer 170 has a total average optical reflectance of at least 70% in the visible wavelength range 80 for a first polarization state; a total average optical transmittance of at least 70% in the visible wavelength range for a second polarization state perpendicular to the first polarization state; and a total optical transmittance of at least 50%, or at least 60%, or at least 70% for the at least one infrared wavelength 91 in the infrared wavelength range 90 for at least one of the first and second polarization states.

Useful reflective polarizers and useful reflecting layers include polymeric multilayer optical films such as those described in U.S. Pat. No. 5,882,774 (Jonza et al.); U.S. Pat. No. 6,179,948 (Merrill et al.); U.S. Pat. No. 6,783,349 (Neavin et al.); and U.S. Pat. No. 9,162,406 (Neavin et al.), for example.

In some embodiments, each first reflective segment 71, 72 is or includes a metal. In some embodiments, each first reflective segment 71, 72 is or includes a multilayer segment or multilayer film.

Figure 6:
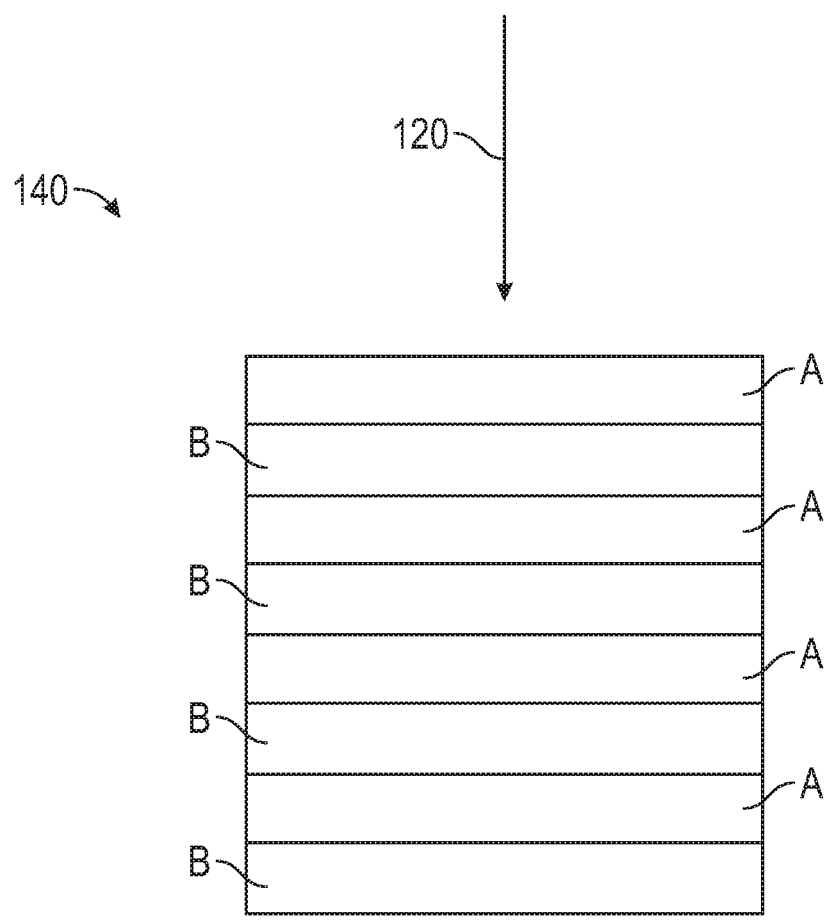
FIG. 6 is a schematic cross-sectional view of a multilayer segment or film.
Figure 7:
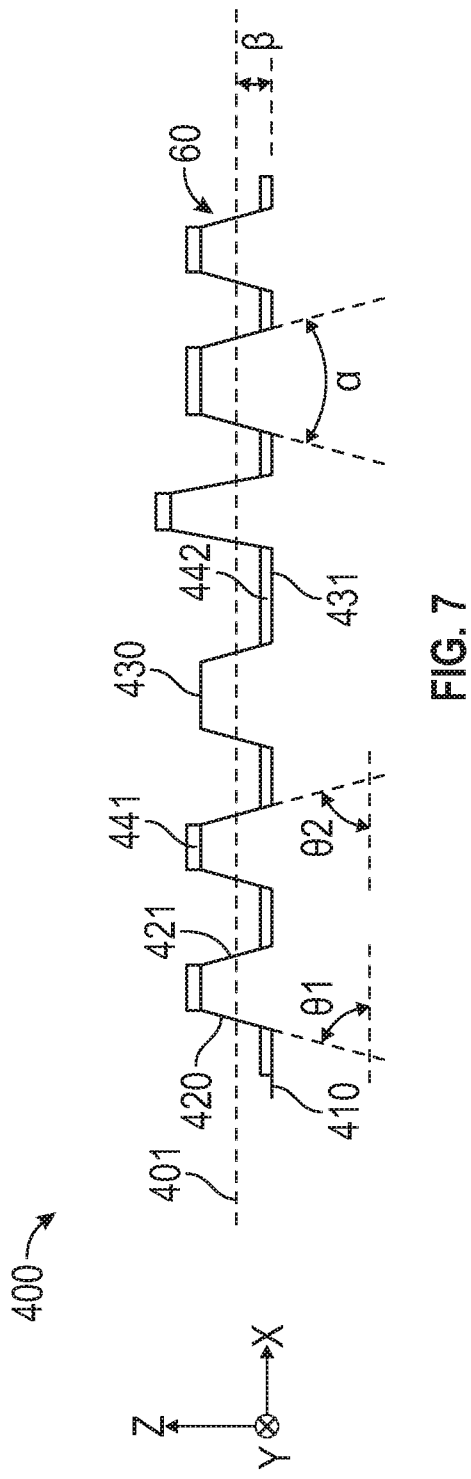
FIG. 7 is a schematic cross-sectional view of a structured optical layer.

FIG. 6 is a schematic cross-sectional view of a multilayer segment or film 140 which may correspond to any one or more of segments 71 and/or 72, and/or multilayer films 441 and/or 442 (see, FIG. 7). The multilayer segment or film 140 includes alternating layers A and B in the illustrated embodiment. As is known in the art, the reflective properties of a multilayer reflector can be adjusted by suitable selection of layer thicknesses and refractive indices determined by choice of materials for the layers. The alternating layers A, B can be alternating inorganic layers, alternating polymeric layers, or one of the layers A, B can be an inorganic layer and the other of the layers A, B can be an organic polymeric layer, for example. The A layers can be acrylate layers or other polymeric layers, for example, and the B layers can be $TiO_2$ layers or NbOx layers or other inorganic layers (e.g., magnesium fluoride, silicon dioxide, tantalum pentoxide, or zinc sulfide), for example. In some embodiments, the A and B layers are each polymeric layers. However, the thickness of the resulting segments or films may be thicker than typically desired when both the A and B layers are polymeric layers due to relatively small refractive index difference in polymer layers. Accordingly, it is typically preferred that at least one of the A and B layers are inorganic. The layer thicknesses and refractive indices can be selected such that the reflective segment or film is reflective in a desired wavelength range (e.g., the visible range 80) and transmissive for at least one wavelength outside the desired wavelength range (e.g., the at least one infrared wavelength 91 in the infrared wavelength range 90). In some embodiments, each first reflective segment 70, 71 or each multilayer film 441, 442 includes a plurality of stacked layers, each layer having an average thickness of less than about 500 nm, or less than about 400 nm, or less than about 300 nm, or less than about 200 nm. In some embodiments, each first reflective segment 70, 71 or each multilayer film 441, 442 includes a plurality of alternating A and B layers, such that for at least one wavelength (e.g., 532 nm or 633 nm) in the visible wavelength range 80, the A layers have a lower index of refraction than the B layers.

The multilayer segment or film 140 may have reflectance and transmittance properties as described elsewhere for first reflective segments 70, 71. For example, in some embodiments, for substantially normally incident light 120, the multilayer segment or film 140 has a total average optical reflectance of at least 50%, or at least 70%, or at least 90% in the visible wavelength range 80; and a total optical transmittance of at least 30%, or at least 40%, or at least 50%, or at least 60%, or at least 70% for the at least one infrared wavelength 91 in the infrared wavelength range 90.

FIG. 7 is a schematic cross-sectional view of a structured optical layer 400. The structured optical layer 400 defines a plane 401 of the structured optical layer 400. The structured optical layer 400 includes a structured surface 410 including a regular array of first segments 420, 421, where each first segment makes an angle θ1, θ2, respectively, between about 30 degrees to about 60 degrees with the plane 401 of the structured optical layer 400. The structured optical layer 400 includes a plurality of second segments 430, 431, where each second segment 430, 431 makes an angle β of less than about 10 degrees with the plane 401 of the structured optical layer 400 (e.g., each second segment may be approximately parallel to the plane 401 so that the angles β are approximately zero degrees). In some embodiments, the structured optical layer 400 includes a multilayer film 441, 442 disposed on each of at least a majority of the second segments 430, 431, respectively. The multilayer film 441 and/or 442 may correspond to multilayer film or segment 140, for example. In some embodiments, each layer in the multilayer film has a thickness less than about 500 nm, such that for substantially normally incident light 120, the multilayer film has a total average optical reflectance of at least 50% in a visible wavelength range 80 extending from about 420 nm to about 650 nm; and a total optical transmittance of at least 30% for at least one infrared wavelength 91 in an infrared wavelength range 90 extending from about 800 nm to about 1200 nm. Each layer can have a thickness in the ranges described elsewhere herein. The average optical reflectance in the visible wavelength range 80 can be in any of the ranges described elsewhere herein. The optical transmittance for the at least one infrared wavelength 91 can be in any of the ranges described herein In some embodiments, the reflective segments or reflectors or films (e.g., 70, 71, 140, 441, 442 or those illustrated in FIGS. 8-11) have a thickness less than about 10 micrometers, or less than about 5 micrometers, or less than about 3 micrometers. The thickness may be in a range of about 500 nm or 1 micrometer to about 10 micrometers or to about 5 micrometers, for example.

FIGS. 8-11 are schematic cross-sectional views of light redirecting films that can be used as light redirecting film 230 and/or 330 in optical system 300 and/or which includes a structured layer corresponding to light redirecting layer 50 and/or 51 and/or to structured optical layer 400.

Figure 8:
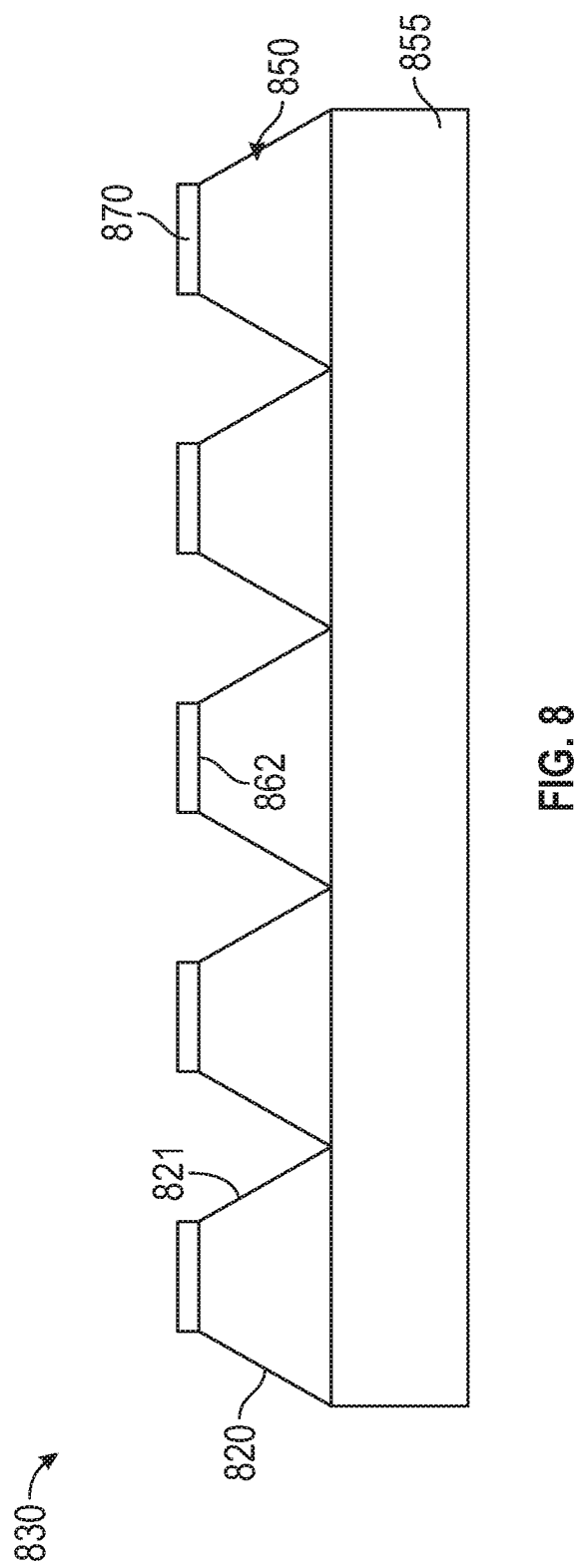
FIGS. 8-11 are schematic cross-sectional views of light redirecting films.

FIG. 8 is a schematic cross-sectional view of a light redirecting film 830 including a plurality of structures 850 disposed on a substrate 855. The structures 850 includes a regular array of first segments 820, 821 (e.g., corresponding to first segments 420, 421 or first facets 61) and a plurality of second segments 862 (e.g., corresponding to second segments 430 or window segments 62). A reflector 870 (e.g., corresponding to multilayer film 441 or first reflective segments 70) is disposed on each of at least a majority of the second segments 862 (each second segment 862 in the illustrated embodiment).

Figure 9:
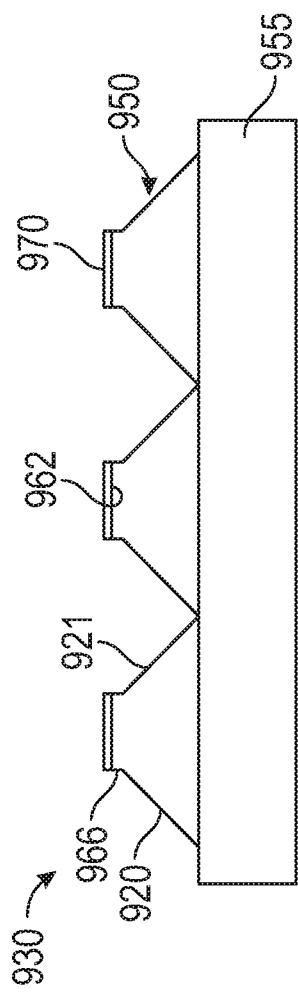

FIG. 9 is a schematic cross-sectional view of a light redirecting film 930 including a plurality of structures 950 disposed on a substrate 955. The structures 950 includes a regular array of first segments 920, 921 (e.g., corresponding to first segments 420, 421 or first facets 61) and a plurality of second segments 962 (e.g., corresponding to second segments 430 or window segments 62). A reflector 970 (e.g., corresponding to multilayer film 441 or first reflective segments 70) is disposed on each of at least a majority of the second segments 962 (each second segment 962 in the illustrated embodiment). A section 966, which may be a substantially vertical section, separates the second segments 862 from ends of the first segments 920, 921. The section 966 may be formed integrally with the structures 950 or may be a layer added to truncated prisms when the reflector 870 is added (e.g., via a transfer film technique).

Figure 10:
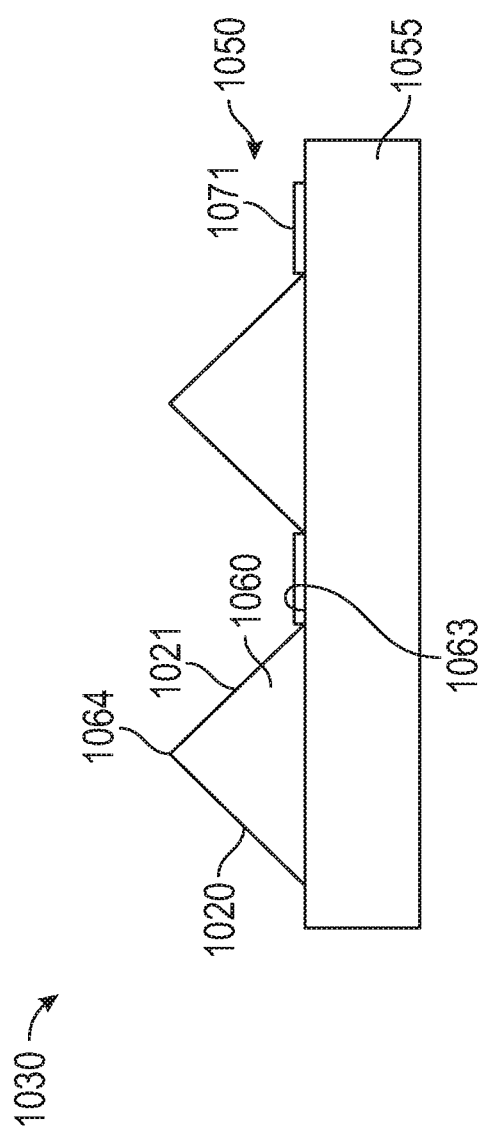

FIG. 10 is a schematic cross-sectional view of a light redirecting film 1030 including a plurality of structures 1050 disposed on a substrate 1055. The structures 1050 includes a regular array of first segments 1020, 1021 (e.g., corresponding to first segments 420, 421 or first facets 61) and a plurality of second segments 1063 (e.g., corresponding to second segments 431 or window segments 63). A reflector 1071 (e.g., corresponding to multilayer film 442 or first reflective segments 71) is disposed on each of at least a majority of the second segments 1063 (each second segment 1063 in the illustrated embodiment). In some embodiments, the plurality of structures 1050 is or includes a regular array of light redirecting structures which includes the regular array of first segments 1020, 1021. In some embodiments, the first segments 1020, 1021 of at least one light redirecting structure 1060 meet at a peak 1064 of the light redirecting structure 1060.

Figure 11:
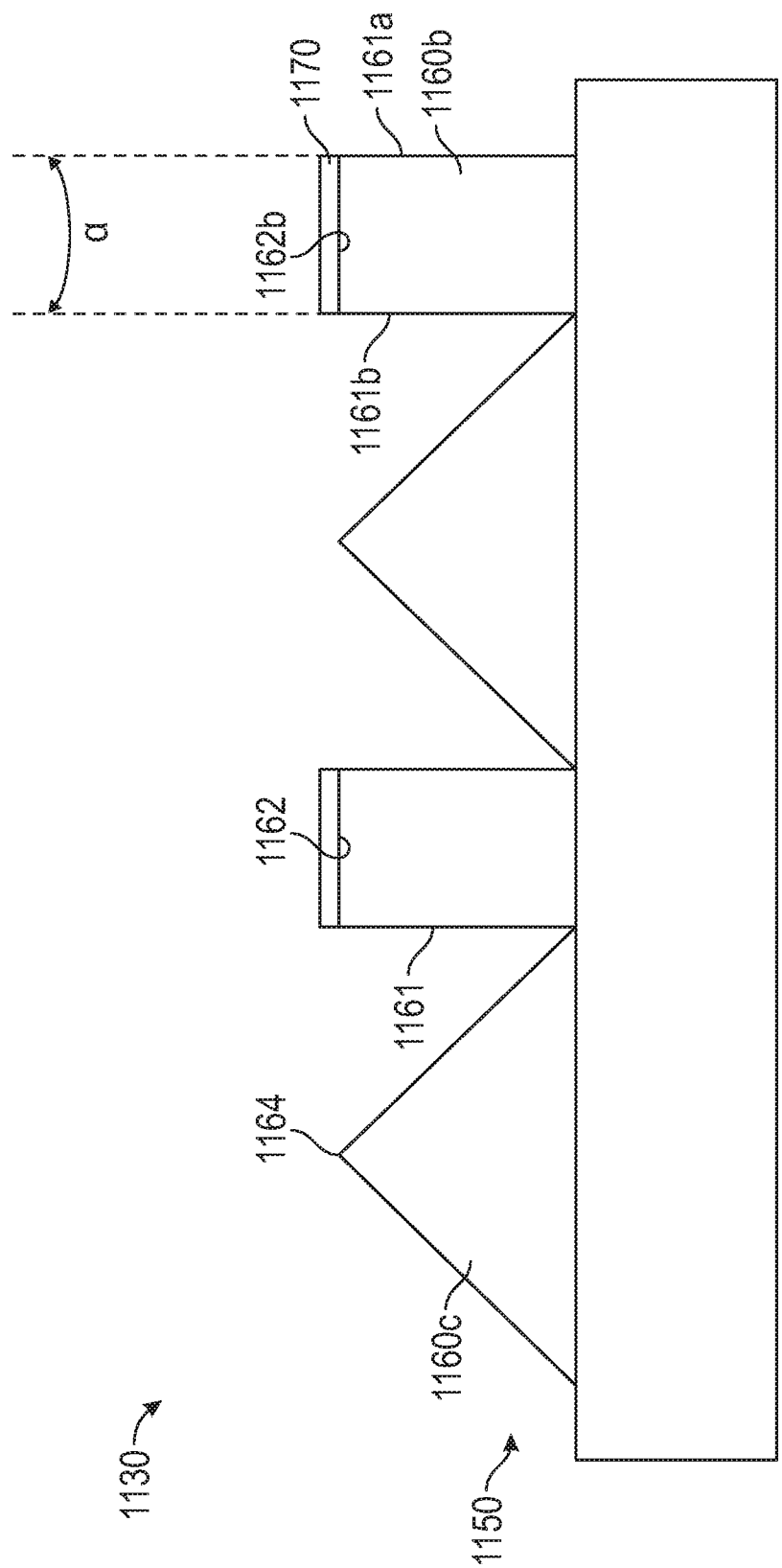

FIG. 11 is a schematic cross-sectional view of a light redirecting film 1130 including a plurality of light redirecting structures 1150 that include a plurality of first facets 1161 and a plurality of first window segments 1162. Light redirecting film 1130 includes a plurality of first reflective segments 1170. In some embodiments, each first reflective segment 1170 is disposed on, and is substantially co-extensive with, a corresponding first window segment 1162. In some embodiments, at least one first window segment 1162b in the plurality of first window segments 1162 is a top segment of a truncated first light redirecting structure 1160b in a regular array of first light redirecting structures 1150, where the at least one first widow segment 1162b connects the plurality of first facets 1161a, 1161b of the truncated first light redirecting structure 1160b to each other. In some embodiments, at least two opposing first facets 1161a, 1161b in the plurality of first facets 1161 of the truncated first light redirecting structure 1160b define an angle α of less than about 20 degrees therebetween. In some embodiments, the first facets of at least one first light redirecting structure 1160c meet at a peak 1164 of the light redirecting structure 1160c. In some embodiments, at least one first light redirecting structure 1160b is taller than at least one other first light redirecting structure 1160c.

Some methods of making the light redirecting layers or films or the structured optical layers with reflective segments or films described herein are as follows.

In some embodiments (e.g., where reflective segments are formed on top surfaces of structures (see, e.g., FIG. 8)), a structured film (e.g., a truncated prism film) can be made using a cast and cure processes (see, e.g., U.S. Pat. Appl. Pub. No. 2006/0114569 (Capaldo et al.) and U.S. Pat. No. 5,175,030 (Lu et al.) and U.S. Pat. No. 5,183,597 (Lu)), or made by extrusion, or made by machining, or made by embossing, as is known in the art. Any suitable materials can be used. For example, an acrylate (e.g., polymethylmethacrylate) can be cast and cured onto a polyester (e.g., polyethylene terephthalate) substrate. After forming the structured film, the reflective layer at the tops of the structures can be applied using a transfer film. The transfer film may be as described in PCT Pub. Nos. WO 2018/178802 (Gotrik et al.) or WO 2018/178803 (Gotrik et al.), for example. The transferred reflective segment can be or include a metallic layer or can be or include alternating layers as described elsewhere. In some embodiments, the transferred material includes additional layers transferred with the reflective segment. For example, the transferred material can include an adhesive layer for bonding the reflective segment to the tops of the structures. The transferred material can also include material (e.g., a substrate between the reflective segment and a release liner) that is subsequently removed (e.g., a sacrificial material removed via heating) after the reflective segments have been transferred.

In some embodiments (e.g., where reflective segments are formed between structures (see, e.g., FIGS. 1, 7, and 10) and optionally also on tops of structures (see, e.g., FIGS. 1 and 7)), the film can be made as follows. A tool having a shape inverted from the desired shape of the light redirecting layer or structured optical layer can be made by any suitable technique. The tool may be a metal tool (e.g., made by diamond turning as is known in the art) or may be a polymer tool formed from a metal tool (e.g., by compression molding the polymer against the metal tool), for example. The tool having the inverted shape can have ridges corresponding to segments 63, for example, and valleys corresponding to segments 62, for example. A reflective segment can be disposed on each ridge, or on at least a majority of the ridges, using a transfer film, for example, where the transferred reflective segment is releasably attached the ridge after being transferred from the transfer film. Then, a resin can be cast and cured against the tool such that when the resin is removed from the tool, the reflective segment is transferred from the ridges of the tool to the cured resin to form a reflective segment 71, for example. Next, if desired, another transfer film can be used to transfer a reflective layer to the resulting segments 62, for example, on the cured resin layer. Transferring a metallic layer from a transfer film to ridges of a tool and then to a cast and cured layer is described in U.S. Pat. Appl. No. 62/843,739 filed on May 6, 2019 and titled "Patterned Conductive Article".

Another method of making the light redirecting layers or films or the structured optical layers with reflective segments or films described herein is as follows. First, a structured layer (e.g., having a shape as described for light redirecting layer 50 or as illustrated in any of FIGS. 7-11) can be made without reflective segments or films (e.g., in a cast and cure process, or by embossing, or by extrusion, or by machining) Second, photolithographic techniques can be used to form reflective segments (e.g., 70, 71) or multilayer films (e.g., 441, 442) on the structured layer. For example, a mask can be applied using photolithographic processes known in the art, a metal layer or a plurality of alternating layers can be sputtered onto the exposed portions of the structured layer or applied using other deposition methods known in the art, and then the mask removed.

Figure 12:
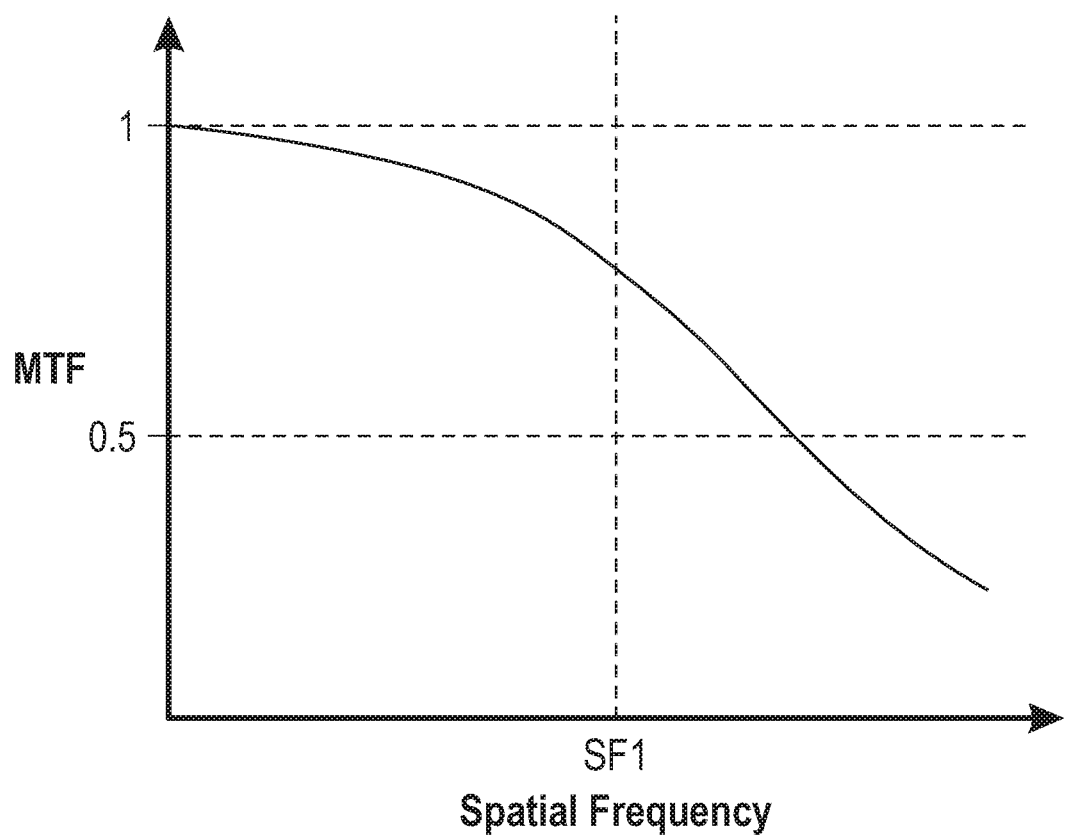
FIG. 12 is a schematic plot of a modulation transfer function (MTF) versus spatial frequency.

In some embodiments, the light redirecting layers or films or the structured optical layers with reflective segments or films provides brightness enhancement while allowing an image of a fingerprint, for example, to be transmitted through the layers or films substantially normally to a plane of the layers or films. The quality of the transmitted image can be characterized by a modulation transfer function (MTF). FIG. 12 is a schematic plot of an MTF versus spatial frequency. As is known in the art, the MTF can be a useful quantity to characterize the resolution of an optical system. The MTF can be determined by displaying an image of a line chart at a given spatial frequency and determining the maximum and minimum intensities in the displayed image. The MTF is given by the ratio of the difference in the maximum and minimum intensities divided by the sum of the maximum and minimum intensities. A spatial frequency SF1 is indicated. SF1 can be about 8 line pairs per mm, about 10 line pairs per mm, or about 12 line pairs per mm, for example.

In some embodiments, an optical system 300 includes an extended illumination source 200 configured to emit visible light (10a-10c) (e.g., in a wavelength range extending from about 420 nm to about 650 nm) from an extended emission surface 20 or 21 thereof. The extended illumination source 200 can include at least one light source (e.g., 30 and/or 31) configured to emit visible light; and a reflecting layer 40 spaced apart from, and substantially co-extensive with, the extended emission surface 20 or 21. The optical system 300 can include a liquid crystal display panel 180 disposed on, and substantially co-extensive with, the extended emission surface, and configured to form a visible image 181 for viewing by a viewer 190. The optical system can include a reflective polarizer 170 disposed between the extended illumination source 200 and the liquid crystal display panel 180. The optical system 300 includes at least one light redirecting layer 50 and/or 150 which can be disposed between the reflective polarizer 170 and the extended illumination source 200. The at least one light redirecting layer 50 and/or 150 includes a regular array of linear prismatic structures 60 extending along a first direction (e.g., y-axis) and arranged along an orthogonal second direction (e.g., x-axis). In some embodiments, the at least one light redirecting layer 50 and/or 150 increases a brightness of light 10d exiting the optical system 300 along a normal direction (z-axis) substantially perpendicular to the optical system 300 by recycling a portion of light (10a-10c) emitted by the extended emission surface. In some embodiments, when an infrared image 192 having an infrared wavelength 91 from about 800 nm to about 1200 nm is incident on the optical system 300 along the normal direction, the optical system 300 transmits at least a portion of the incident infrared image 192 therethrough along the normal direction, such that when the infrared image 192 has a first spatial frequency of at least about 8 line pairs per mm, the transmitted infrared image (e.g., 193) has a modulation transfer function (MTF) of greater than about 0.5 at the first spatial frequency. In some embodiments, the first spatial frequency is greater than about 10 line pairs per mm or greater than about 12 line pairs per mm. In some embodiments, the MTF is greater than about 0.6 or greater than about 0.7 at the first spatial frequency.

In some embodiments, the light redirecting layers or films or the structured optical layers with reflective segments or films provides brightness enhancement than can be characterized by an axial luminance gain (ratio of axial luminance when the layer(s) or film(s) are included to the axial luminance when they are not).

FIG. 13A is a schematic cross-sectional view of a light source 700 which can be an extend illumination source corresponding to extended illumination source 200 and/or which can be a Lambertian light source that emits visible light in the visible wavelength range 80, for example. The light source 700 has an emission surface 720. FIG. 13B is a schematic cross-sectional view of a light redirecting film 730 disposed on the light source 700.

In some embodiments, a light redirecting film 730 (e.g., corresponding to light redirecting film 230, 330, 830, 930, 1030, or 1130; or corresponding to a light redirecting film that includes structured optical layer 400) includes a light redirecting layer 50 including a first structured major surface 52 opposite a second major surface 53. The first structured major surface 52 can include a plurality of substantially parallel linear truncated prismatic structures 60 extending along a first direction (e.g., y-axis) and arranged along an orthogonal second direction (e.g., x-axis), where each truncated prismatic structure includes opposing side facets (e.g., corresponding to facets 61a, 61b) making an angle (e.g., corresponding to the angle α schematically illustrated in FIG. 7) in a range from about 60 degrees to about 120 degrees with each other, and a top facet (e.g., corresponding to window segment 62 or segment 430) substantially parallel to the second major surface 53 and connecting the opposing side facets. The light redirecting film 730 can include a plurality of multilayer segments (e.g., corresponding to segments 70 and/or multilayer segments or film 140). Each multilayer segment can be disposed on, and substantially co-extensive with, the top facet of a corresponding truncated prismatic structure. Each multilayer segment can include a plurality of stacked layers (e.g., layers A and B schematically illustrated in FIG. 6), where each layer has a thickness less than about 500 nm, such that for substantially normally incident light 120, the multilayer segment has a total average optical reflectance of at least 50% in a visible wavelength range 80 extending from about 420 nm to about 650 nm, and a total optical transmittance of at least 30% for at least one infrared wavelength 91 in an infrared wavelength range 90 extending from about 800 nm to about 1200 nm. In some embodiments, when the light redirecting film 730 is disposed on a Lambertian light source (e.g., light source 700) that emits visible light 710a (e.g., corresponding to light 10a-10c) in the visible wavelength range 80, and has a total average optical reflectance of at least 85% in the visible wavelength range 80 and a first luminance along a direction normal to the Lambertian light source, light 710d transmitted by the light redirecting film 730 has a second luminance along the normal direction, where a ratio of the second luminance to the first luminance is greater than about 1. This ratio may be described as the axial luminance when the light redirecting film 730 is disposed on a Lambertian light source normalized by the axial luminance of the Lambertian light source without the light redirecting film 730. In some embodiments, the ratio of the second luminance to the first luminance is greater than about 1.2, or greater than about 1.4, or greater than about 1.6, or greater than about 1.8.

In some embodiments, an optical system (e.g., optical system 300) includes an extended illumination source (e.g., extended illumination source 200) configured to emit light from an extended emission surface thereof; and a structured optical layer (e.g., structured optical layer 400) or a light redirecting film (e.g., light redirecting film 230, 330, 730, 830, 930, 1030, or 1130) disposed on the extended emission surface.

Examples

Optical modeling was carried out for an optical system as schematically illustrated in FIG. 13B that included one or two (crossed) light redirecting film disposed on an extended Lambertian light source having a specified total average optical reflectance. The light redirecting film was as schematically illustrated in FIG. 8 except that a 1 micrometer adhesive between the reflector 870 and the segments 862 was modeled. The truncated prisms were modeled as having a refractive index of 1.65. The pitch of the truncated prisms was 24 micrometers and the width of the segments 862 (width of tops of truncated prisms) and the total average optical reflectance of the reflector 870 was varied. The normalized integrated intensity was determined as the integrated intensity divided by the integrated intensity of the light source without the light redirecting film(s). The normalized axial luminance (axial gain) was determined as the axial luminance divided by the axial luminance of the light source without the light redirecting film(s). For a single prism film and a Lambertian light source having a diffuse back reflector with an average optical reflectance of 98.5%, the gain with a regular (non-truncated) prism film was 1.98, the gain with a truncated prism film having a width of the segments 862 of 25% of the pitch and without the reflector 870 was 1.6, and the gain with the truncated prism film with the reflector 870 having a 100% visible light optical reflectance was 1.99. For crossed prism films and a Lambertian light source having a diffuse back reflector with an average optical reflectance of 98.5%, the gain with regular (non-truncated) prism films was 4.4, the gain with truncated prism films each having a width of the segments 862 of 25% of the pitch and without the reflector 870 was 2.5, and the gain with the truncated prism films with the reflector 870 having a 100% visible light optical reflectance was 3.7.

Figure 14A:
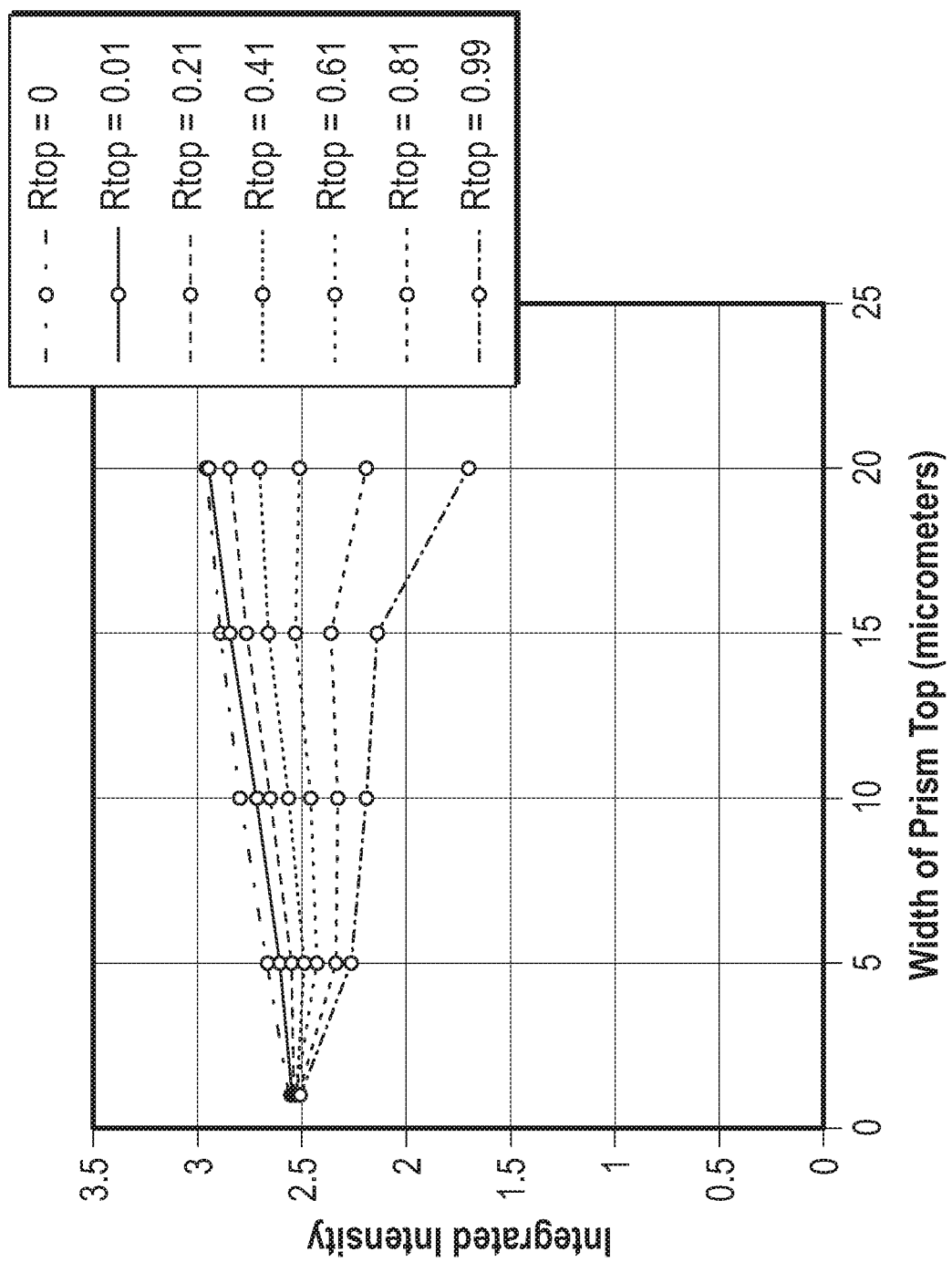
FIGS. 14A-14B are plots of normalized integrated intensity and normalized axial luminance, respectively, of an optical system including a single light redirecting film disposed on a light source having an average optical reflectance of 86.5%.
Figure 14B:
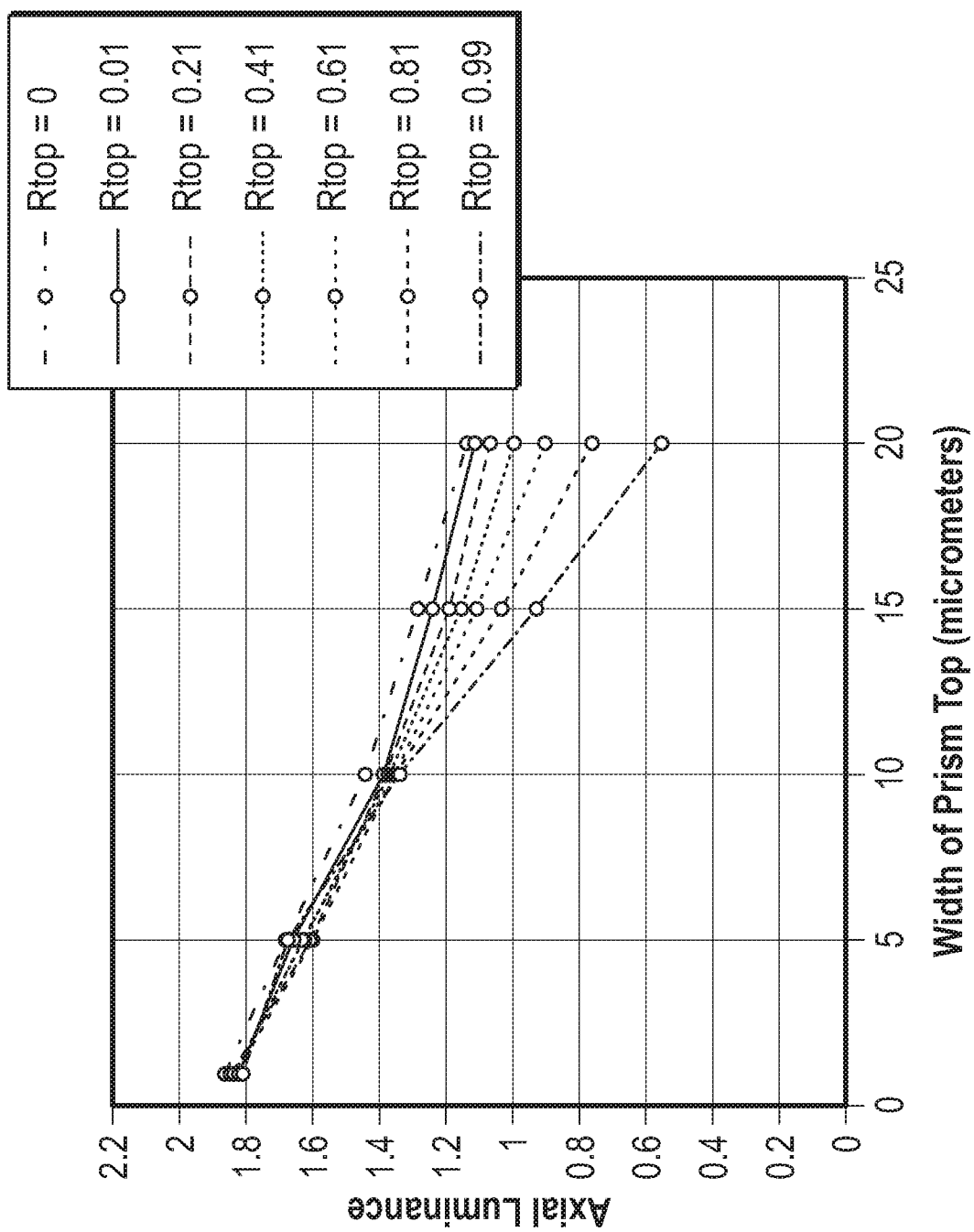
Figure 15A:
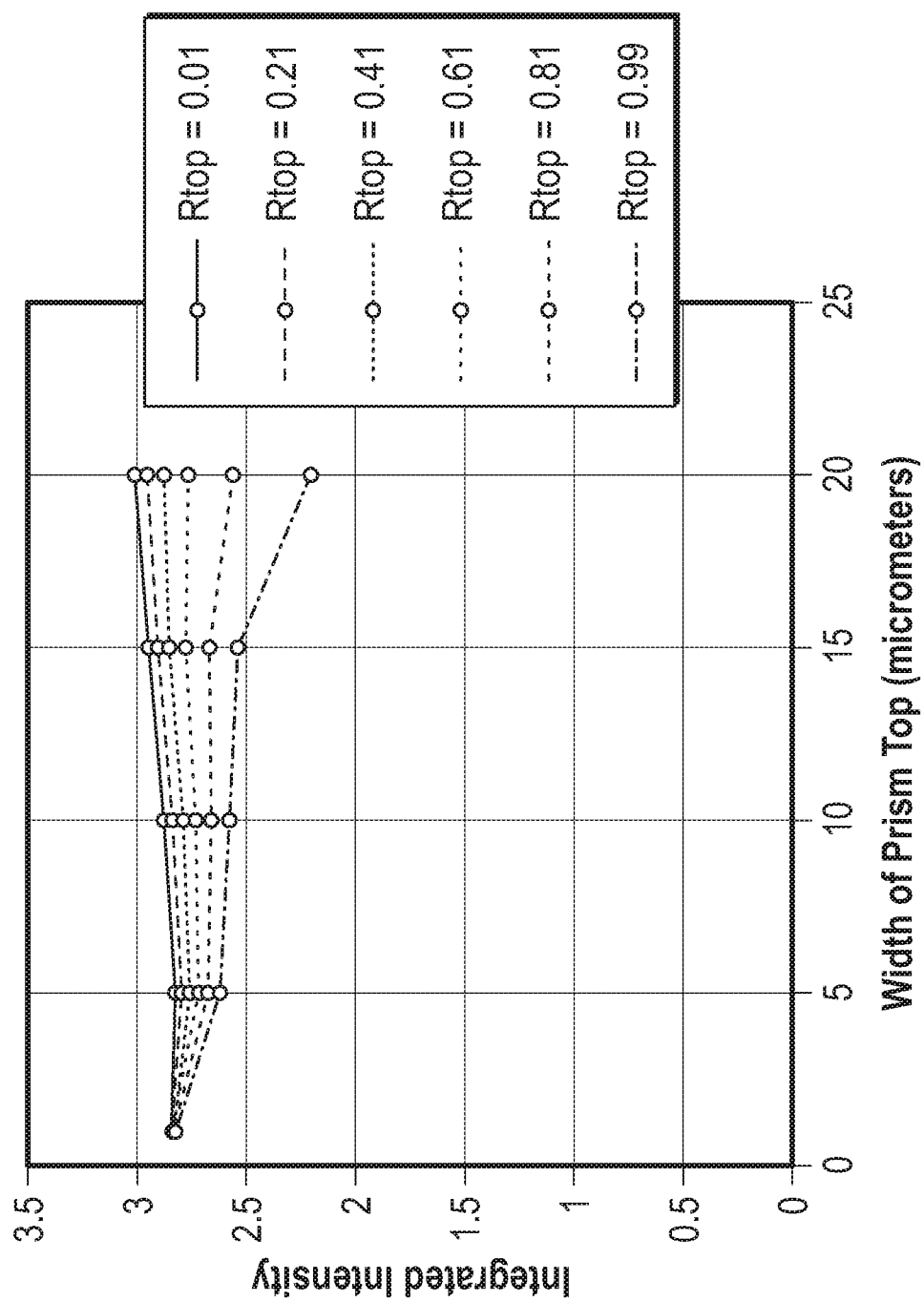
FIGS. 15A-15B are plots of normalized integrated intensity and normalized axial luminance, respectively, of an optical system including a single light redirecting film disposed on a light source having an average optical reflectance of 95%.
Figure 15B:
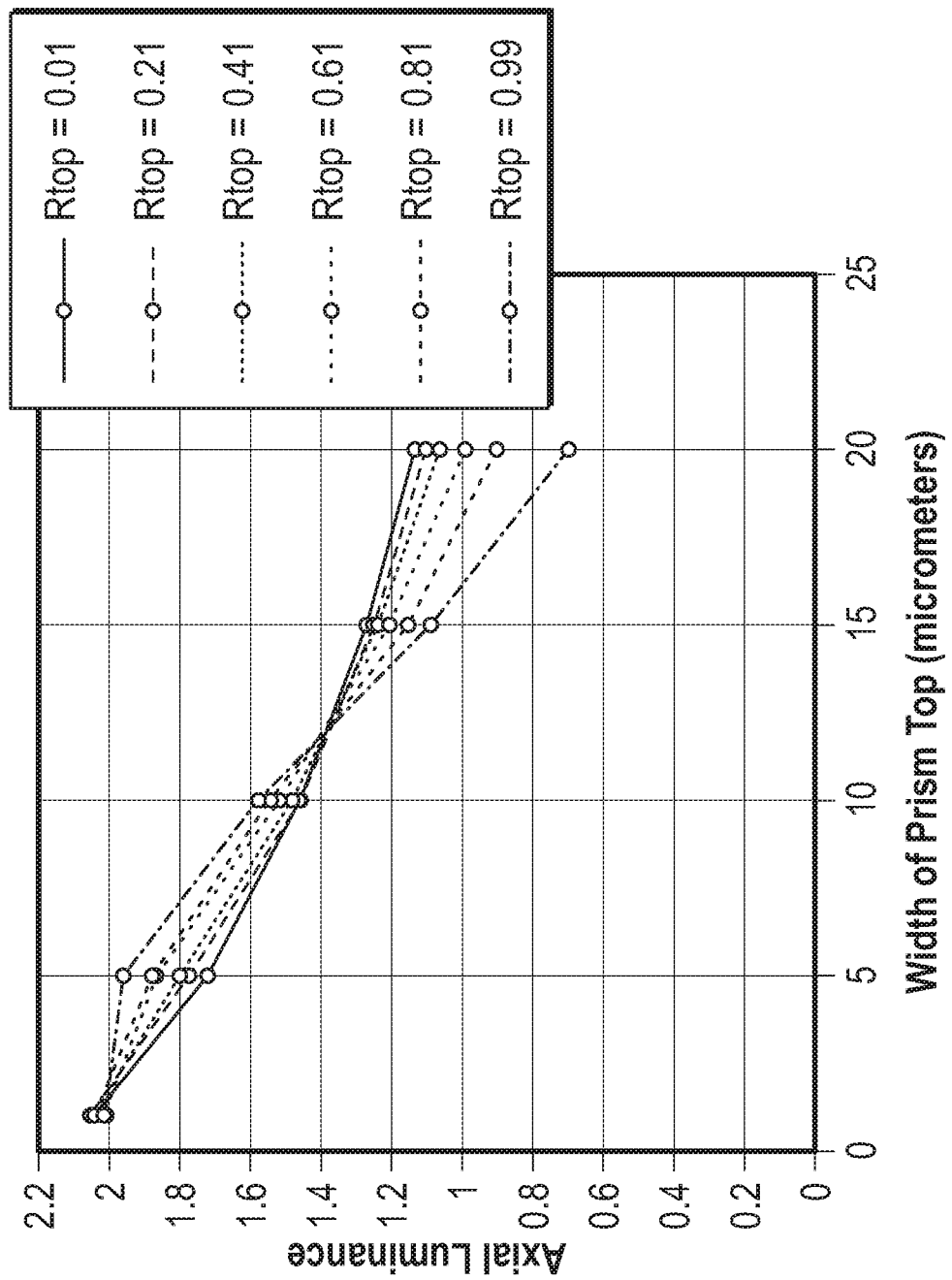
Figure 16A:
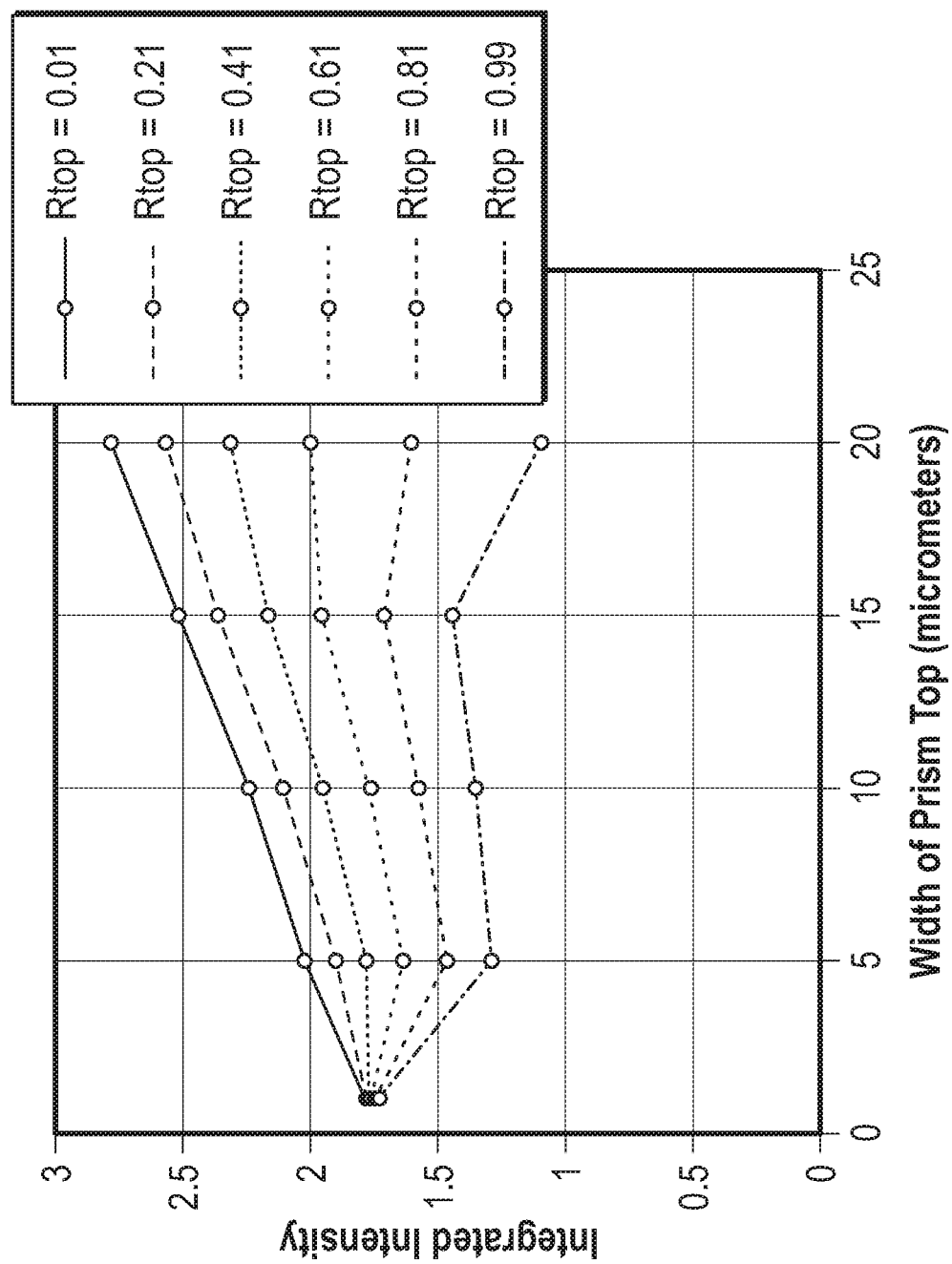
FIGS. 16A-16B are plots of normalized integrated intensity and normalized axial luminance, respectively, of an optical system including crossed light redirecting films disposed on a light source having an average optical reflectance of 86.5%.
Figure 16B:
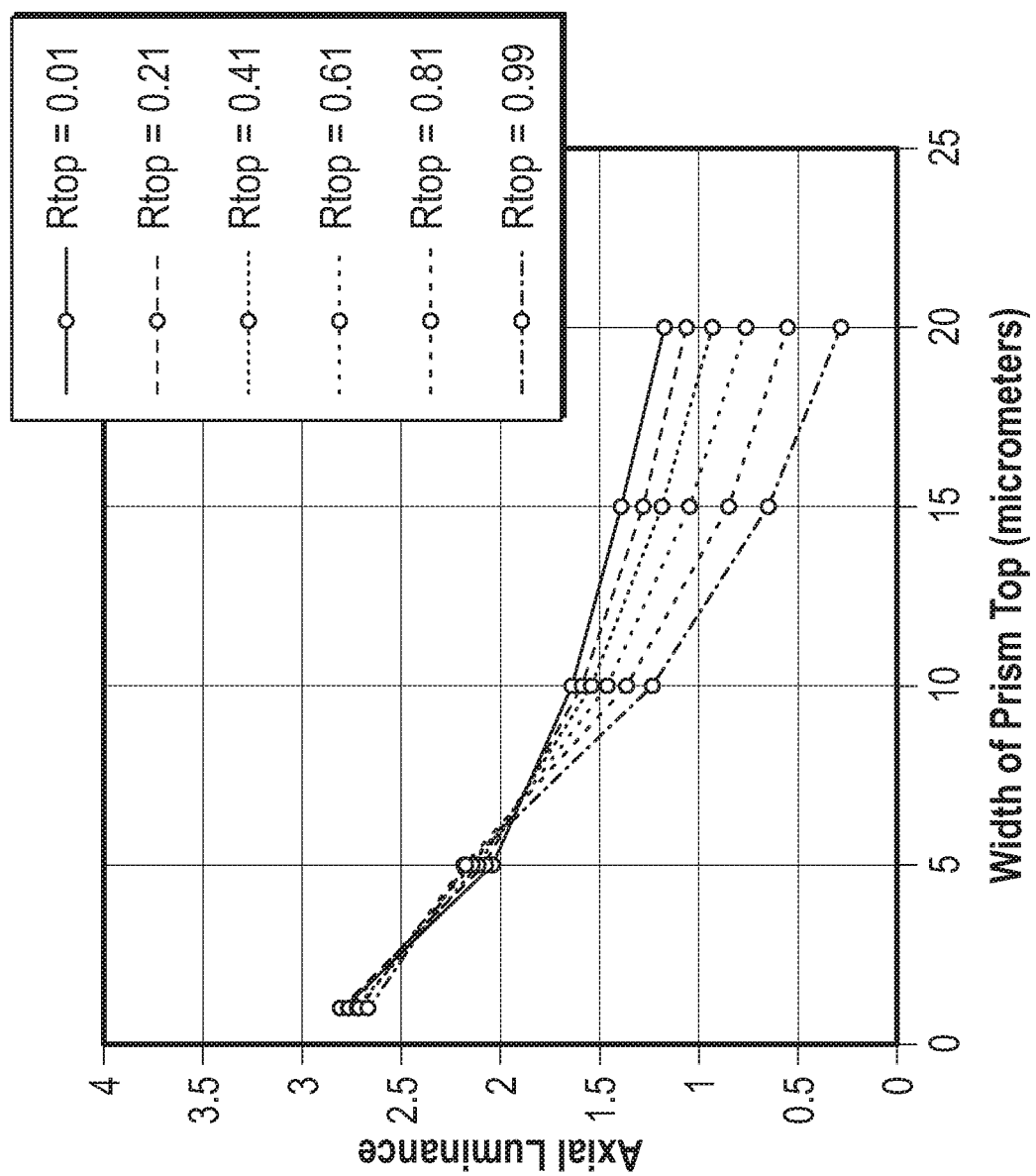
Figure 17A:
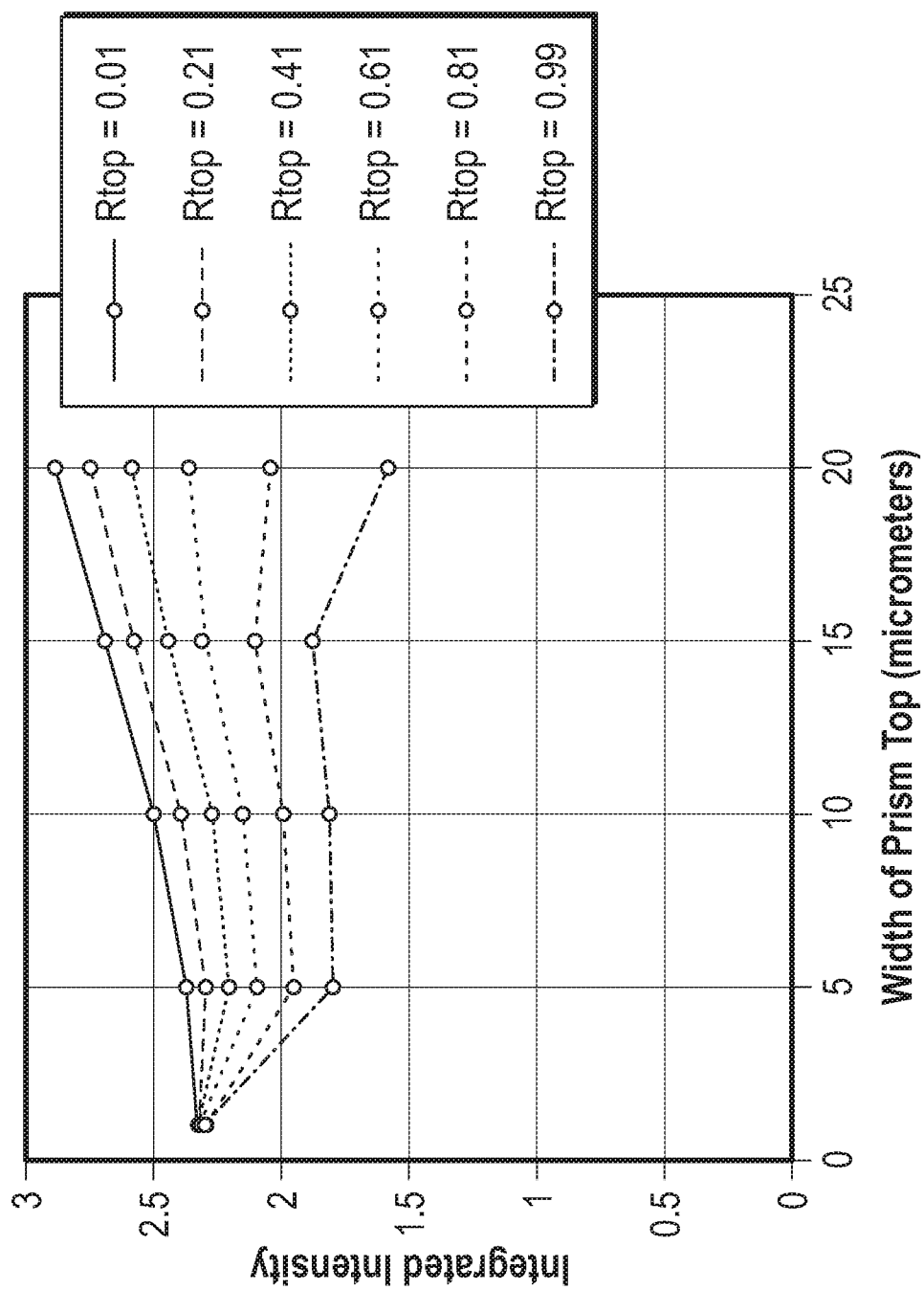
FIGS. 17A-17B are plots of normalized integrated intensity and normalized axial luminance, respectively, of an optical system including crossed light redirecting films disposed on a light source having an average optical reflectance of 95%.
Figure 17B:
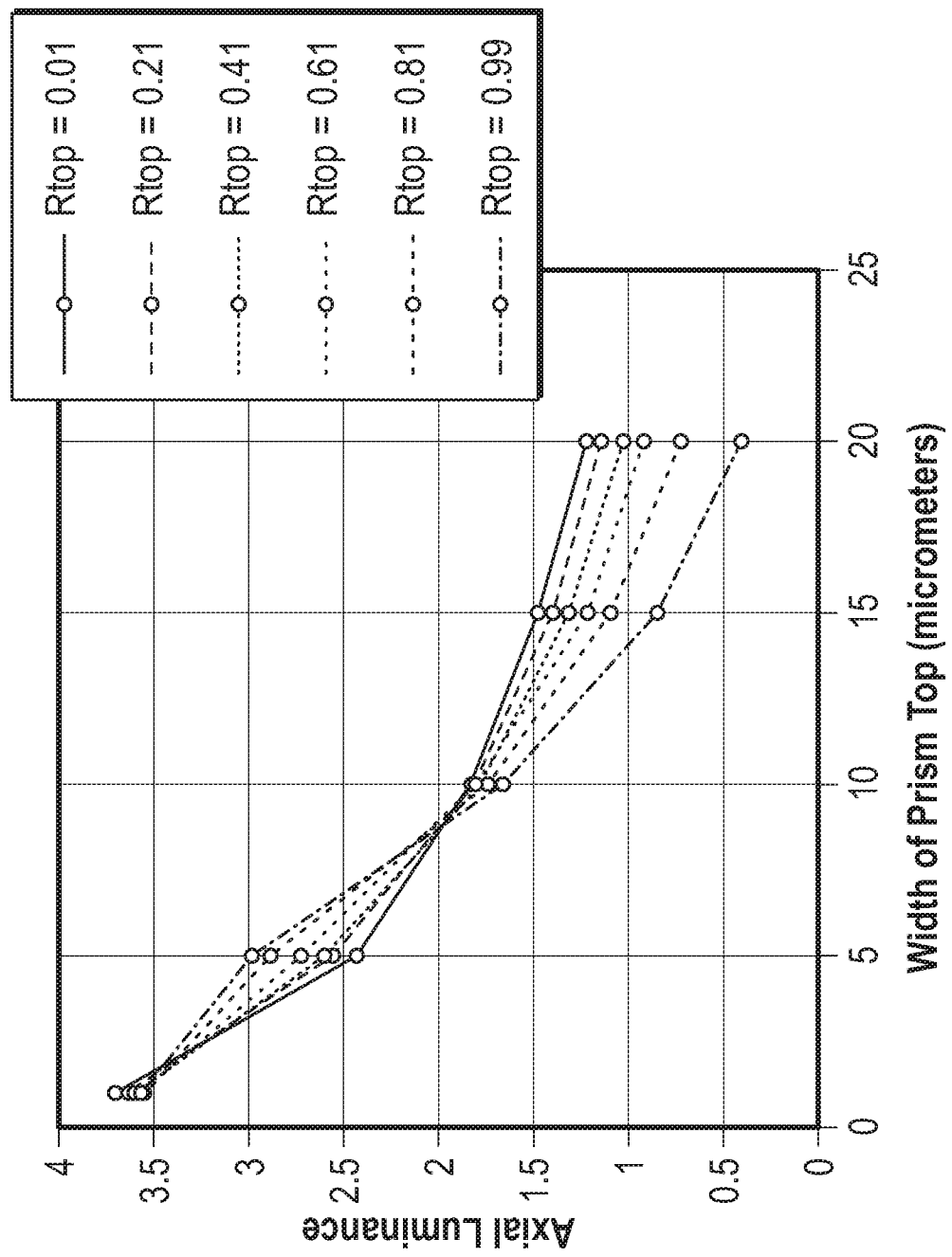

Results of the modeling for various light source reflectivities, various widths of the tops of the truncated prisms, and various reflectances (Rtop) of the reflector 870 are shown in FIGS. 14A-17B (from 0% or 1% reflectance to 99% reflectance). FIGS. 14A-14B are plots of normalized integrated intensity and normalized axial luminance, respectively, of an optical system including a single light redirecting film disposed on a Lambertian light source having an average optical reflectance of 86.5%. FIGS. 15A-15B are plots of normalized integrated intensity and normalized axial luminance, respectively, of an optical system including a single light redirecting film disposed on a Lambertian light source having an average optical reflectance of 95%. FIGS. 16A-16B are plots of normalized integrated intensity and normalized axial luminance, respectively, of an optical system including crossed light redirecting films disposed on a Lambertian light source having an average optical reflectance of 86.5%. FIGS. 17A-17B are plots of normalized integrated intensity and normalized axial luminance, respectively, of an optical system including crossed light redirecting films disposed on a Lambertian light source having an average optical reflectance of 95%.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system, comprising:
   an extended illumination source configured to emit light from an extended emission surface thereof, and comprising:
      at least one light source; and
   a reflecting layer spaced apart from, and substantially co-extensive with, the extended emission surface, the reflecting layer configured to reflect incident light that is emitted from the at least one light source toward the extended emission surface;

a first light redirecting layer defining a plane of the first light redirecting layer and disposed on the extended emission surface and comprising a first structured major surface opposite a second major surface, the first structured major surface comprising:

a regular array of first light redirecting structures, each first light redirecting structure comprising a plurality of first facets making oblique angles with the plane of the first light redirecting layer; and a plurality of discrete spaced apart first window segments substantially parallel to the plane of the first light redirecting layer; and a plurality of first reflective segments, each first reflective segment disposed on, and substantially co-extensive with, a corresponding first window segment, such that for substantially normally incident light, each first reflective segment has a total:

average optical reflectance of at least 30% in a visible wavelength range extending from about 420 nm to about 650 nm; and optical transmittance of at least 10% for at least one infrared wavelength in an infrared wavelength range extending from about 800 nm to about 1200 nm.

2. The optical system of claim 1, wherein the extended illumination source comprises:

a lightguide for propagating light therein along a length and width of the lightguide, the lightguide disposed between the reflecting layer and the first light redirecting layer and comprising the extended emission surface; and the at least one light source disposed proximate an edge surface of the lightguide, the reflecting layer configured to reflect light that exits the lightguide toward the reflecting layer, the reflected light propagating toward the first light redirecting layer.

3. The optical system of claim 1, wherein the extended illumination source comprises:

a first optically diffusive layer for scattering light and comprising the extended emission surface, the first optically diffusive layer and the reflecting layer substantially coextensive with each other and defining an optical cavity therebetween; and the at least one light source disposed in the optical cavity.

4. The optical system of claim 1, wherein for each first reflective segment and for substantially normally incident light, at least 70% of:

the total average optical reflectance of the first reflective segment in the visible wavelength range is specular optical reflectance; and the total optical transmittance of the first reflective segment for the at least one infrared wavelength in the infrared wavelength range is specular optical transmittance.

5. The optical system of claim 1, wherein each first light redirecting structure in the regular array of light redirecting structures is a linear structure, wherein the first facets of the first light redirecting structure extend along a length direction of the first light redirecting structure, the first light redirecting structure having a length L and a width W, L/W>10.

6. The optical system of claim 1, wherein at least one first window segment in the plurality of first window segments is a land segment between two adjacent first light redirecting structures in the regular array of first light redirecting structures.

7. The optical system of claim 1, wherein at least one first window segment in the plurality of first window segments is a top segment of a truncated first light redirecting structure in the regular array of first light redirecting structures, the at least one first widow segment connecting the plurality of first facets of the truncated first light redirecting structure to each other.

8. The optical system of claim 1, wherein each first reflective segment comprises a metal.

9. The optical system of claim 1, wherein each first reflective segment comprises a plurality of stacked layers, each layer having an average thickness of less than about 500 nm.

10. The optical system of claim 1 further comprising:

a second light redirecting layer defining a plane of the second light redirecting layer and disposed on the first light redirecting layer and comprising a third structured major surface opposite a fourth major surface, the third structured surface comprising:

a regular array of second light redirecting structures, each second light redirecting structure comprising a plurality of second facets making oblique angles with the plane of the second light redirecting layer; and a plurality of discrete spaced apart first second window segments substantially parallel to the plane of the second light redirecting layer; and a plurality of second reflective segments, each second reflective segment disposed on, and substantially co-extensive with, a corresponding second window segment, such that for substantially normally incident light, each second reflective segment has a total:

average optical reflectance of at least 30% in the visible wavelength range; and optical transmittance of at least 10% for the at least one infrared wavelength in the infrared wavelength range.

11. The optical system of claim 1, wherein for substantially normally incident light and for each of mutually orthogonal first and second polarization states, the reflecting layer has a total:

average optical reflectance of at least 80% in the visible wavelength range; and optical transmittance of at least 20% for the at least one infrared wavelength in the infrared wavelength range.

12. A structured optical layer defining a plane of the structured optical layer and comprising:

a structured surface comprising a regular array of first segments, each first segment making an angle from about 30 degrees to about 60 degrees with the plane of the structured optical layer, and a plurality of second segments, each second segment making an angle of less than about 10 degrees with the plane of the structured optical layer; and a multilayer film disposed on each of at least a majority of the second segments, each layer in the multilayer film having a thickness less than about 500 nm, such that for substantially normally incident light, the multilayer film has a total:

average optical reflectance of at least 50% in a visible wavelength range extending from about 420 nm to about 650 nm; and optical transmittance of at least 30% for at least one infrared wavelength in an infrared wavelength range extending from about 800 nm to about 1200 nm.

13. An optical system, comprising:
an extended illumination source configured to emit visible light in a wavelength range extending from about 420 nm to about 650 nm from an extended emission surface thereof, and comprising:
at least one light source configured to emit visible light; and
a reflecting layer spaced apart from, and substantially co-extensive with, the extended emission surface;
a liquid crystal display panel disposed on, and substantially co-extensive with, the extended emission surface, and configured to form a visible image for viewing by a viewer;
a reflective polarizer disposed between the extended illumination source and the liquid crystal display panel; and
at least one light redirecting layer disposed between the reflective polarizer and the extended illumination source, and comprising a regular array of linear prismatic structures extending along a first direction and arranged along an orthogonal second direction, the at least one light redirecting layer increasing a brightness of light exiting the optical system along a normal direction substantially perpendicular to the optical system by recycling a portion of light emitted by the extended emission surface, such that when an infrared image having an infrared wavelength in a range from about 800 nm to about 1200 nm is incident on the optical system along the normal direction, the optical system transmits at least a portion of the incident infrared image therethrough along the normal direction, such that when the infrared image has a first spatial frequency of at least about 8 line pairs per mm, the transmitted infrared image has a modulation transfer function (MTF) of greater than about 0.5 at the first spatial frequency.

14. A light redirecting film comprising:
a light redirecting layer comprising a first structured major surface opposite a second major surface, the first structured major surface comprising a plurality of substantially parallel linear truncated prismatic structures extending along a first direction and arranged along an orthogonal second direction, each truncated prismatic structure comprising opposing side facets making an angle in a range from about 60 degrees to about 120 degrees with each other, and a top facet substantially parallel to the second major surface and connecting the opposing side facets; and
a plurality of multilayer segments, each multilayer segment disposed on, and substantially co-extensive with, the top facet of a corresponding truncated prismatic structure, each multilayer segment comprising a plurality of stacked layers, each layer having a thickness less than about 500 nm, such that for substantially normally incident light, the multilayer segment has a total average optical reflectance of at least 50% in a visible wavelength range extending from about 420 nm to about 650 nm, and a total optical transmittance of at least 30% for at least one infrared wavelength in an infrared wavelength range extending from about 800 nm to about 1200 nm, such that when the light redirecting film is disposed on a Lambertian light source that emits visible light in the visible wavelength range, and has a total average optical reflectance of at least 85% in the visible wavelength range and a first luminance along a direction normal to the Lambertian light source, light transmitted by the light redirecting film has a second luminance along the normal direction, a ratio of the second luminance to the first luminance greater than about 1.

15. The light redirecting film of claim 14, wherein the ratio of the second luminance to the first luminance is greater than about 1.6.

* * * * *